United States Patent
Gebbink et al.

(10) Patent No.: US 11,498,711 B2
(45) Date of Patent: Nov. 15, 2022

(54) APPARATUS AND METHOD FOR DISCHARGING GUIDING ELEMENTS

(71) Applicant: Fuji Seal International, Inc., Osaka (JP)

(72) Inventors: Jeroen Gerrit Anton Gebbink, Helmond (NL); Marinus Antonius Leonarda Van Heck, Haarsteeg (NL); Stijn Antonius Petrus Verhoeven, Beek en Donk (NL)

(73) Assignee: Fuji Seal International, Inc., Osaka (JP)

( * ) Notice: Subject to any disclaimer, the term of this patent is extended or adjusted under 35 U.S.C. 154(b) by 300 days.

(21) Appl. No.: 16/964,381

(22) PCT Filed: Jan. 24, 2019

(86) PCT No.: PCT/EP2019/051800
§ 371 (c)(1),
(2) Date: Jul. 23, 2020

(87) PCT Pub. No.: WO2019/145448
PCT Pub. Date: Aug. 1, 2019

(65) Prior Publication Data
US 2020/0346807 A1    Nov. 5, 2020

(30) Foreign Application Priority Data

Jan. 24, 2018 (NL) .................................... 2020315
Aug. 6, 2018 (NL) .................................... 2021428

(51) Int. Cl.
*B65B 43/16* (2006.01)
*B65G 47/90* (2006.01)

(52) U.S. Cl.
CPC ............. *B65B 43/16* (2013.01); *B65G 47/90* (2013.01)

(58) Field of Classification Search
CPC ................................ B65B 43/16; B65G 47/90
See application file for complete search history.

(56) References Cited

U.S. PATENT DOCUMENTS 6,059,125 A * 5/2000 Parham .................. A47B 73/00
  211/74
6,360,901 B1 * 3/2002 Parham .................. A47F 7/285
  211/49.1

(Continued)

FOREIGN PATENT DOCUMENTS

DE     10146487 A1 *  4/2003   ............. B65G 47/06

*Primary Examiner* — Joshua G Kotis
*Assistant Examiner* — Scott A Howell
(74) *Attorney, Agent, or Firm* — Locke Lord LLP

(57) ABSTRACT

The present disclosure relates to a discharge apparatus for discharging an assembly of interconnected guiding elements, having a support having at least one support section configured to support the assembly of interconnected guiding elements and the flexible pouch containers carried therein; a gripping unit configured to grip a first guiding element of the guiding element assembly and displace the first guiding element together with one or more interconnected further guiding elements of the guiding element assembly in a transport direction substantially perpendicular to the lengthwise direction of the first guiding element; and a disconnection unit configured to disconnect at least the gripped and displaced first guiding element from a neighboring second guiding element, the disconnection unit having a movable wedge and a wedge drive unit configured to move the wedge between the first and second guiding elements, thereby disconnecting the first guiding element from the second guiding element.

4 Claims, 19 Drawing Sheets

(56) References Cited

U.S. PATENT DOCUMENTS

| | | | |
|---|---|---|---|
| 9,340,308 B2 * | 5/2016 | Nakagawa | B65B 43/465 |
| 9,340,309 B2 * | 5/2016 | Nakagawa | B65B 43/42 |
| 9,725,193 B2 * | 8/2017 | Friedlein | B65B 3/02 |
| 2002/0038756 A1 * | 4/2002 | Hiramoto | B31B 70/00 |
| | | | 198/570 |
| 2016/0059976 A1 * | 3/2016 | Nakagawa | B65B 35/405 |
| | | | 198/681 |
| 2017/0043891 A1 * | 2/2017 | Gebbink | B65D 85/62 |
| 2018/0251247 A1 * | 9/2018 | Gebbink | B65D 75/5861 |

\* cited by examiner

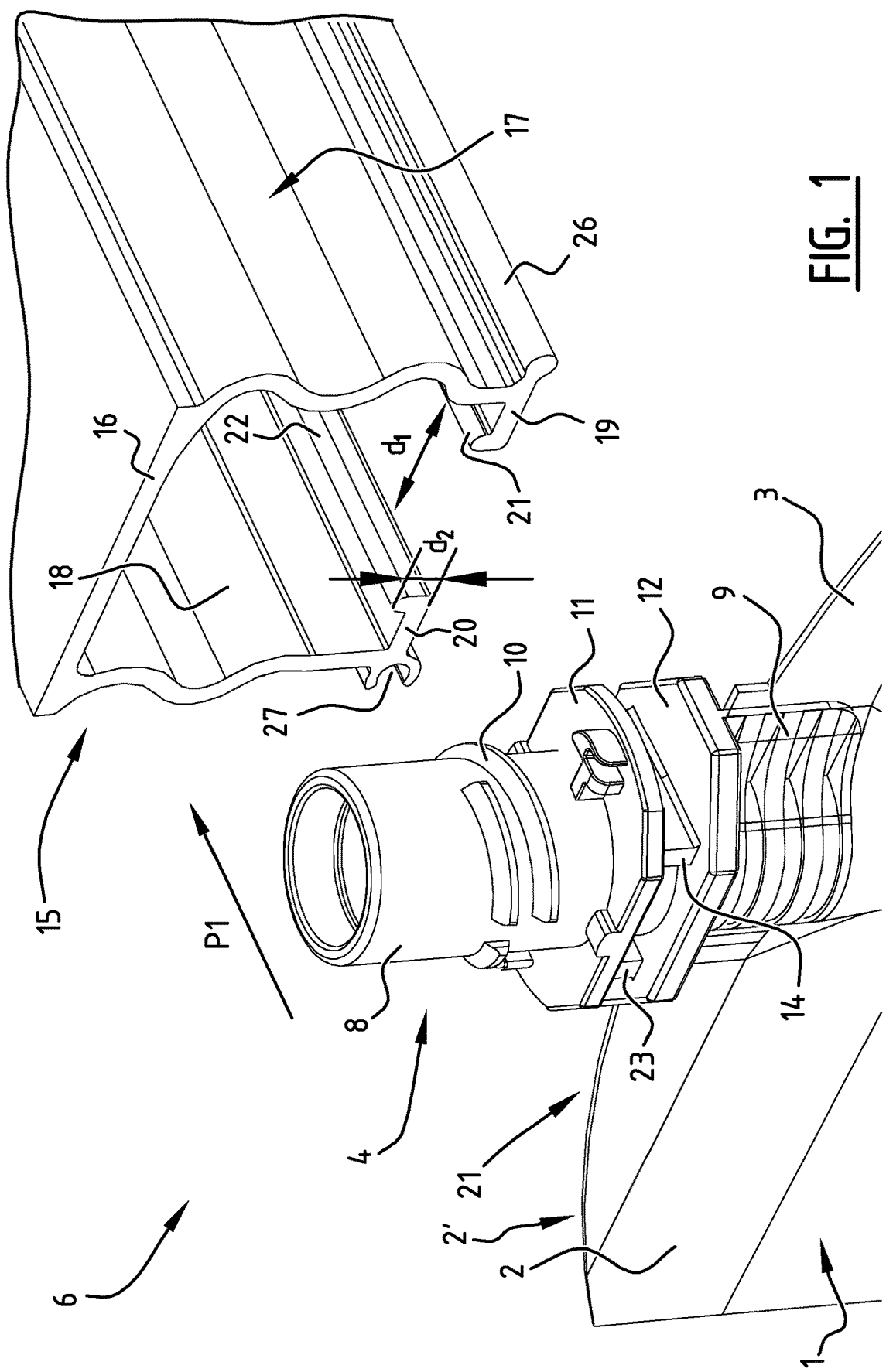

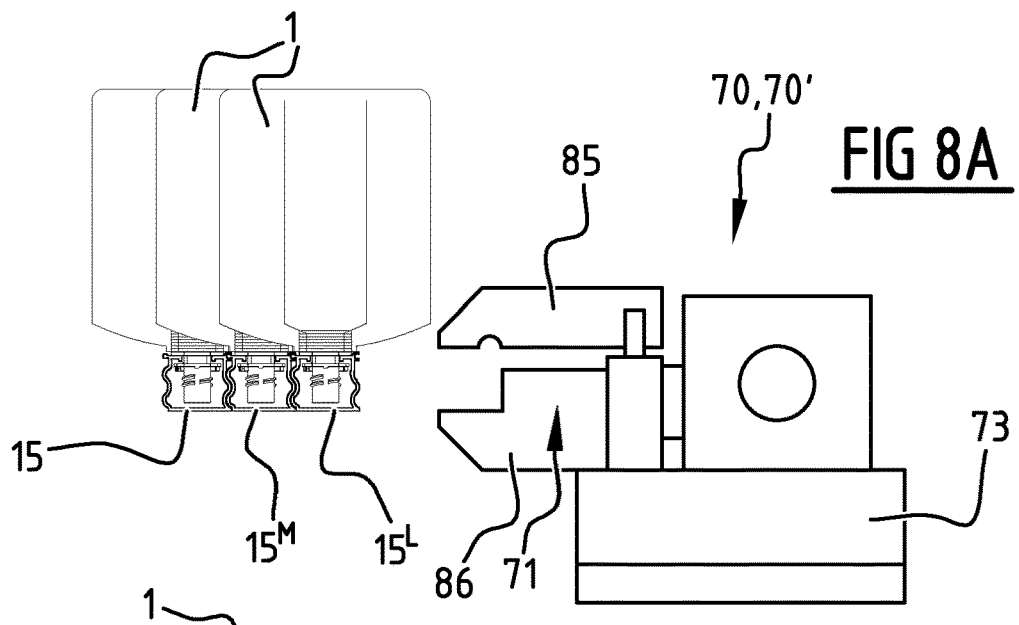
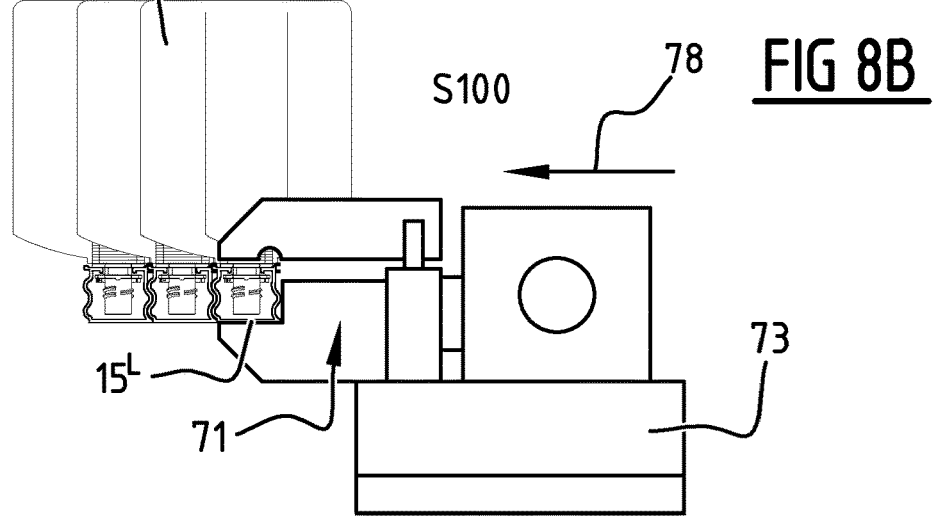
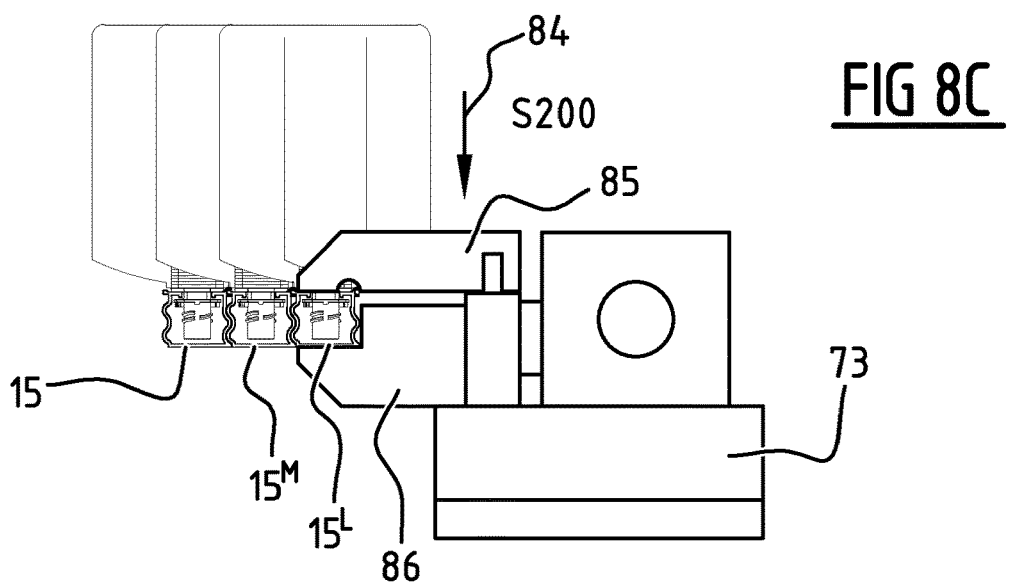

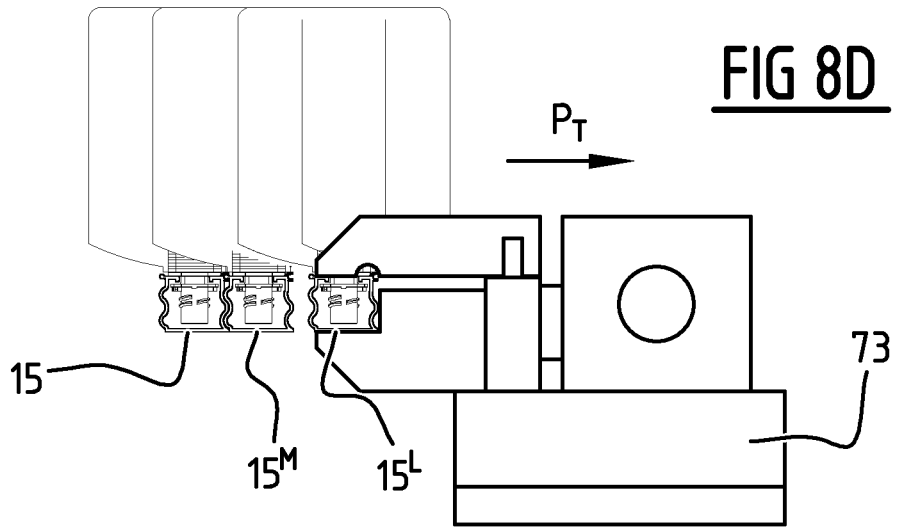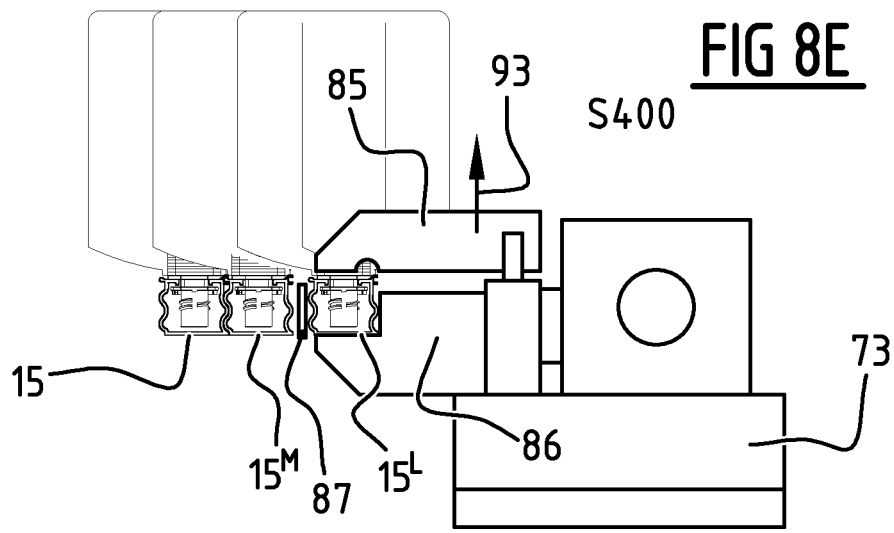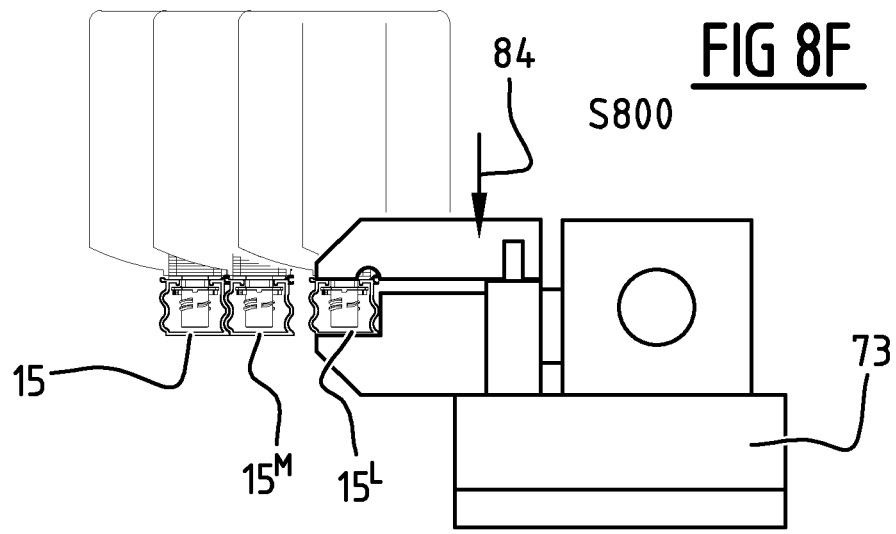

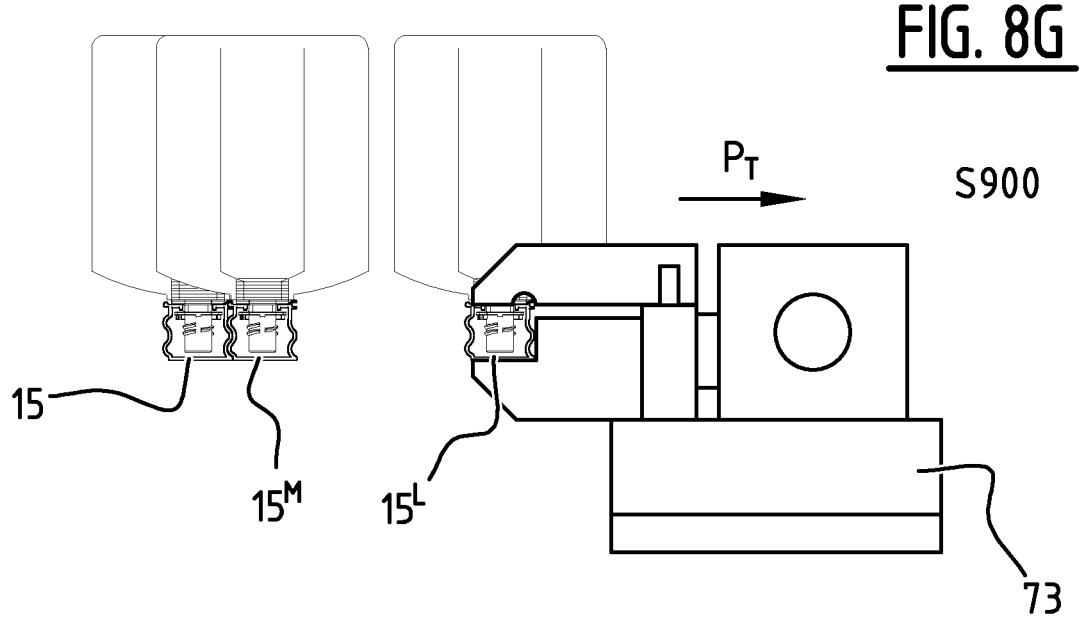
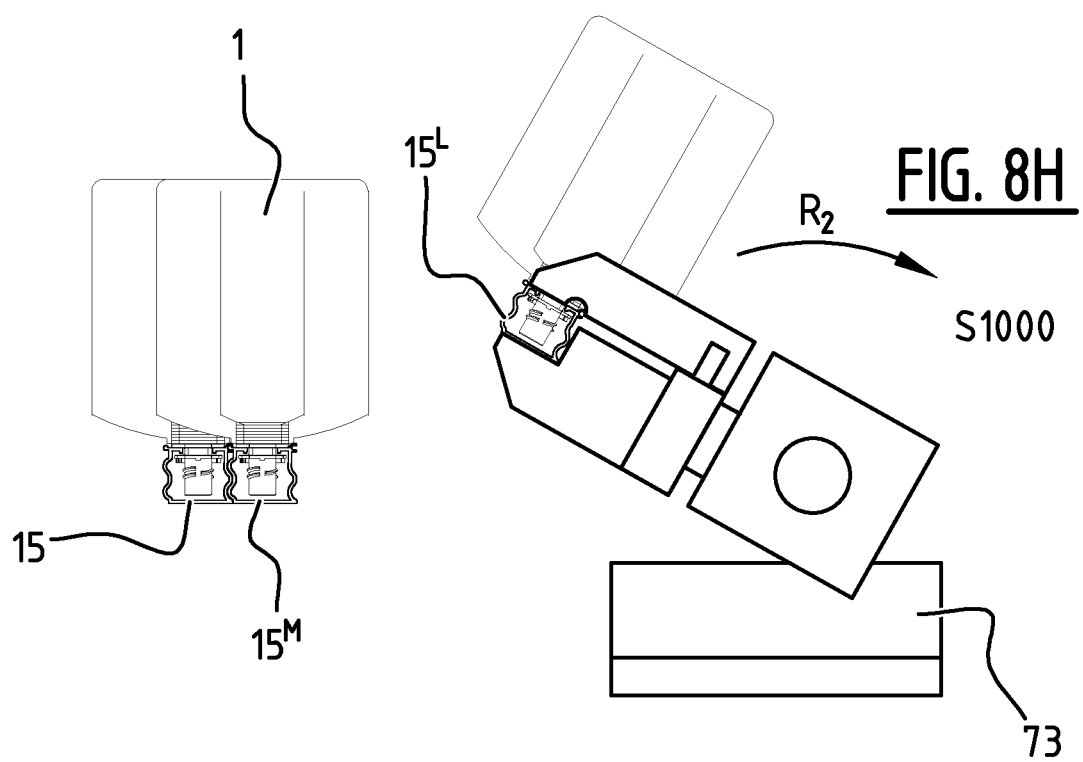

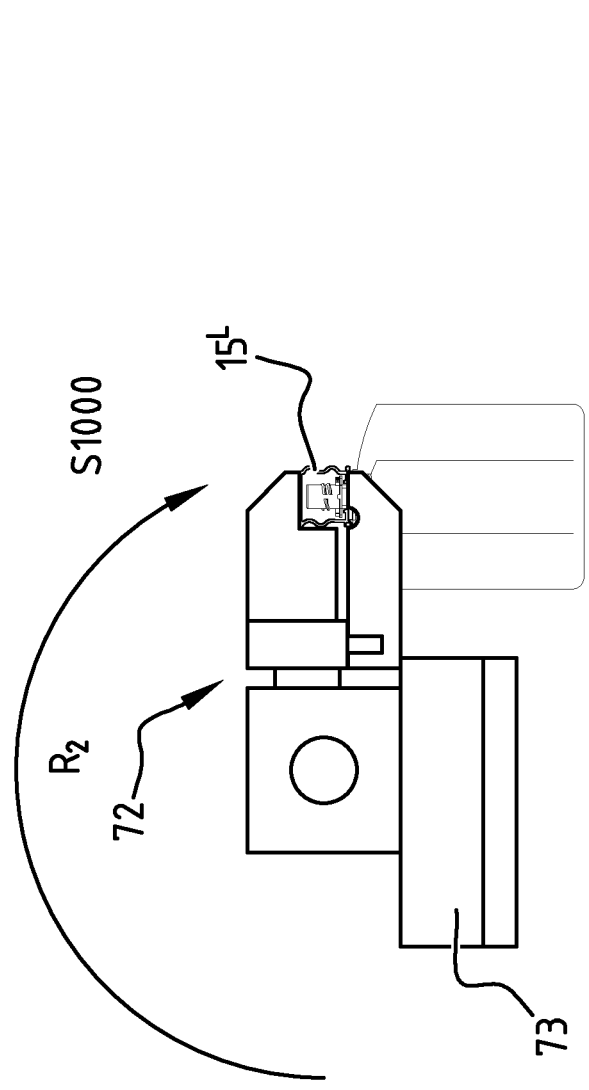
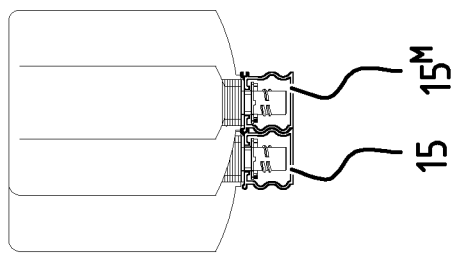
FIG. 8I
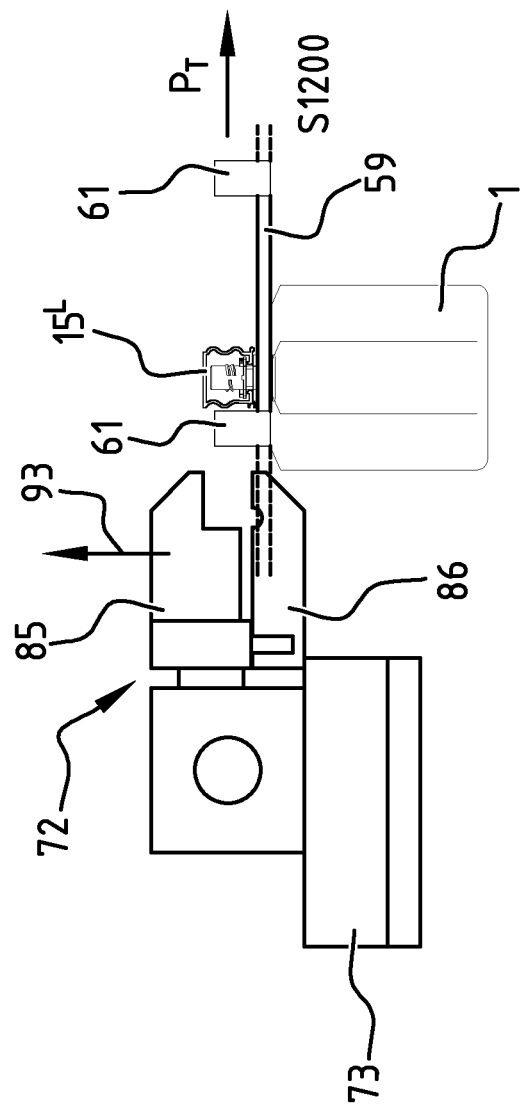
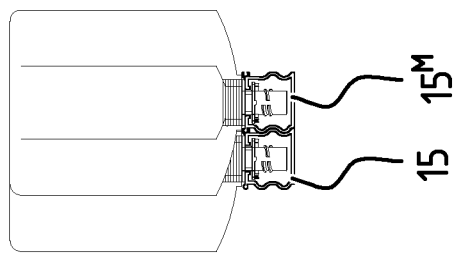
FIG. 8J

APPARATUS AND METHOD FOR DISCHARGING GUIDING ELEMENTS

The present disclosure relates to a discharge apparatus for discharging an assembly of guiding elements, each guiding element configured to carry a row of dispensing spouts and each dispensing spout being associated with a flexible pouch container. The present disclosure also relates to a combination of such discharge apparatus and a handling station comprising a conveyor for transporting guiding elements carrying pouch containers. The present disclosure also relates to a method of discharging such assembly of guiding elements.

Flexible pouch containers may be manufactured at a location that differs from the location at which the containers are filled with products, for instance foodstuff. For instance, the containers may be manufactured at a first location, packed and then transported to a second location where they are unpacked. In order to transport the packed containers, they are loaded into a truck or other transport vehicle and at its destination (i.e. at the second location) the truck needs to be unloaded again. At the second location, for instance the location wherein the foodstuff is available, the unloaded and unpacked containers are filled with content and then transported further.

An example of spouted pouch containers and guiding elements for carrying these pouch containers are known as such, for instance from document WO 2015/128427 A1. Each of the guiding elements is able to carry a plurality of spouted pouch containers (herein also referred to as pouches). The guiding elements can be connected to each other along their lengthwise sides thereof to form a substantially tubular arrangement. The (empty) pouch containers may be stored in the interior of the thus formed tubular arrangement and then be transported protected by the guiding elements surrounding the pouch containers to a location wherein the pouch containers are further handled in a handling station, such as a filling station wherein the individual pouch containers are filled with content.

Document WO 2017/032470 A1 discloses a discharge system for receiving a tubular assembly of guiding elements with pouch containers, remove the pouch containers from the tubular storage assembly and move the pouch containers towards a discharge region. The discharge system is able to discharge the pouch containers in an essentially fully automated manner.

There is a need to provide an alternative or, in some aspects, an even improved solution to the problem of how to discharge the guiding elements in an efficient and/or fast manner. There is also a need to provide an alternative or, in some aspects, an even improved solution to the problem of how to discharge guiding elements using a relatively simple and/or robust construction. There is also a need to have a discharge solution that can be applied to existing handling stations.

According to an aspect this may at least partially be accomplished in a discharge apparatus for discharging an assembly of interconnected guiding elements, each guiding element configured to carry a row of dispensing spouts and each dispensing spout being associated with a flexible pouch container, wherein each guiding element comprises one or more coupling elements arranged along at least a part of the length of the guiding element to releasably couple neighbouring guiding elements, the discharge apparatus comprising:

a support comprising at least one support section configured to support the assembly of interconnected guiding elements and the flexible pouch containers carried therein;

a gripping unit configured to grip a first guiding element of the guiding element assembly and displace the first guiding element together with one or more interconnected further guiding elements of the guiding element assembly in a transport direction substantially perpendicular to the lengthwise direction of the first guiding element;

a disconnection unit configured to disconnect at least the gripped and displaced first guiding element from a neighbouring second guiding element, the disconnection unit comprising a movable wedge and a wedge drive unit configured to move the wedge between the first and second guiding elements, thereby disconnecting the first guiding element from the second guiding element;

wherein the gripping unit is configured to further move the disconnected first guiding element and the pouch containers carried therein in the transport direction to a discharge position.

The set of interconnected guiding elements (herein also referred to as the interconnected guiding element assembly) may comprise elongated guiding elements configured to be maintained in a substantially tubular arrangement while storing the containers in the interior formed by the tubular arrangement.

In embodiments of the disclosure the coupling elements of the guiding elements are configured to allow the guiding elements to be pivotable with respect to each other. More specifically, the plurality of guiding elements may be pivotable between a storage position in which the guiding elements extend in the substantially tubular arrangement and an operating position in which the plurality of guiding elements extend in a substantially curved or flatplane.

The guiding elements may be straight elements arranged in a parallel manner.

Furthermore, the pouch containers are stored in the guiding elements in the tubular arrangement in such a manner that the pouch containers attached to the guiding elements extend along a generally helical trajectory in the interior of the tubular arrangement. In this manner a relatively large storage capacity is obtained. Furthermore the helical arrangement has the effect that the pouch containers become intertwined to such extent, that the guiding elements tend to remain in their tubular arrangement.

In the tubular arrangement in principle each of the guiding elements is connected to two neighbouring guiding elements. When the guiding elements in tubular arrangement have been placed on the support section(s), the tubular arrangement can be opened by disconnecting at least one guiding element from a neighbouring guiding element and unfolding the tubular arrangement until it reaches the flat (straight) arrangement. This disconnecting (opening) and unfolding of the guiding elements is generally performed by hand, i.e. by a (human) operator.

According to an embodiment each of the support sections comprises flat support surfaces configured to support thereon the respective outer ends of the guiding elements of the guiding element assembly and to allow sliding of the guiding element assembly in the transport direction, wherein the flat support surfaces preferably extend in a generally horizontal orientation.

The support sections may be able to carry the guiding elements in a substantially flat arrangement. The guiding elements can be directly placed on the support section(s) when they are in the flat arrangement. In other embodiments, however, the guiding elements are supplied to the discharge apparatus when they are in a substantially tubular arrangement.

According to an embodiment the gripping unit (70) is configured to apply a pulling force on the gripped first guiding element to displace the first guiding element in a transport direction.

According to an embodiment a gripping unit comprises one, two or more grippers, wherein each gripper is configured to be actuated by an actuator for controlled gripping and releasing of a guiding element.

According to an embodiment the gripping unit comprises a rotatable arm, wherein the rotatable arm preferably includes a gripper at both ends of the rotatable arm.

According to an embodiment the rotatable arm is rotatably mounted to a movable carrier attached to the frame, further preferably comprising a drive unit to move the movable carrier linearly in transport direction or in opposite direction.

According to an embodiment the gripping unit comprises a rotatable arm and the gripping unit is configured to give a respective gripper a rotational and translational movement so as to enable gripping of a guiding element and move the gripped guiding element towards the discharge position. The rotatable arm may comprise a gripper at both ends of the rotatable arm.

According to an embodiment the gripping unit is configured to change the orientation of the guiding element with pouch containers from a first orientation wherein the pouch containers rest on the guiding element to a second orientation wherein the pouch containers suspend from the guiding element, for instance using the rotatable arm with gripper(s).

According to an embodiment the discharge apparatus comprising one or more abutment elements, arranged to extend from the contact surface of the support on which the guiding elements are placed, wherein the abutment elements are configured to have the gripping unit arrange the gripped and displaced first guiding element at a fixed position relative to the support, preferably also relative to the disconnection unit.

The abutment elements may be retractable abutment pins configured to form an abutment surface for a guiding element in an abutment position and to allow the guiding element to freely move in a retracted position wherein the abutment pins are recessed in the support.

According to an embodiment the disconnection unit comprises:

a first push unit arranged at one side of the at least one support section and configured to apply a lateral pushing force in the lengthwise direction on the first guiding element in order to shift the first guiding element over a predefined distance (d) in a lateral direction and/or a second push unit arranged at the opposite side of the at least one support section to apply an axial pushing force in the transport direction perpendicular to the lengthwise direction of the first guiding element on a free end of the first guiding element, thereby causing the first guiding element to pivot over a predefined angle ($\alpha$).

The above mentioned distance may be in in the range of 1-2 cm and/or the predefined angle ($\alpha$) may be in the range of 1-10 degrees.

According to another aspect a combination of the discharge apparatus as described herein and a handling station comprising a conveyor for transporting guiding elements carrying pouch containers is provided. The discharge apparatus may further be configured to be place able on top of at least a part of the handling station.

According to another aspect a discharge apparatus for discharging an assembly of guiding elements is provided, wherein each guiding element is configured to carry a row of dispensing spouts and each dispensing spout is associated with a flexible pouch container, the discharge apparatus comprising:

a support comprising at least one support section configured to support the assembly of interconnected guiding elements and the flexible pouch containers carried therein;

a gripping unit configured to grip a first guiding element of the guiding element assembly and displace the first guiding element of the guiding element assembly in a transport direction substantially perpendicular to the lengthwise direction of the first guiding element;

one or more abutment elements, arranged to extend from the contact surface of the support, wherein the abutment elements are configured to have the gripping unit arrange the gripped and displaced first guiding element at a fixed position relative to the support;

retaining unit arranged in at least one of the support sections and configured to allow passing of the leading guiding element in the transport direction and block movement of the leading guiding element in the opposite direction;

wherein the gripping unit is configured to further move the disconnected first guiding element and the pouch containers carried therein in the transport direction to a discharge position.

According to this aspect the guiding elements do not have to be interconnected or even interconnectable. In embodiments according to this aspect the guiding elements do not have any coupling elements. However, the aspect is also applicable to guiding elements that can be interconnected, for instance through the coupling elements described herein.

In an embodiment the retaining unit is formed by a disconnection unit configured to disconnect at least the gripped and displaced first guiding element from a neighbouring second guiding element, the disconnection unit comprising a movable wedge and a wedge drive unit configured to move the wedge between the first and second guiding elements, thereby disconnecting the first guiding element from the second guiding element.

According to an embodiment the retaining unit comprises a retainer element accommodated in a recess of a side wall of the support section, the retainer element being pivotable so as to allow the retainer element to rotate between a first position wherein the retainer element is flush with or recessed relative to the surface of the side wall of the support section and a second position wherein the retainer element protrudes from the surface of the side wall, the retainer element, preferably comprising a spring to bias the retainer element to the second position.

According to another aspect a method of discharging an assembly of interconnected guiding elements is provided, wherein each guiding element is configured to carry a row of dispensing spouts (4) and each dispensing spout being associated with a flexible pouch container, wherein each guiding element comprises one or more coupling elements arranged along at least a part of the length of the guiding element to releasably couple neighbouring guiding elements, the method comprising:

placing the assembly of interconnected guiding elements and the flexible pouch containers carried therein on a support comprising at least one support section gripping a first guiding element of the guiding element assembly;

displacing the gripped first guiding element together with one or more interconnected further guiding elements of the guiding element assembly in a transport direction substantially perpendicular to the lengthwise direction of the first guiding element;

disconnecting at least the gripped and displaced first guiding element from a neighbouring second guiding element, wherein disconnecting comprises moving a movable wedge between the first and second guiding elements thereby disconnecting the first guiding element from the second guiding element;

moving the disconnected first guiding element and the pouch containers carried therein in the transport direction to a discharge position.

According to another aspect a method of discharging an assembly of guiding elements is provided, each guiding element being configured to carry a row of dispensing spouts and each dispensing spout being associated with a flexible pouch container, the method comprising:

placing the assembly of interconnected guiding elements and the flexible pouch containers carried therein on a support comprising at least one support section;

gripping a first guiding element of the guiding element assembly;

displacing the gripped first guiding element together with one or more interconnected further guiding elements of the guiding element assembly in a transport direction substantially perpendicular to the lengthwise direction of the first guiding element, wherein the first guiding element is displaced to abut one or more abutment elements, arranged to extend from the contact surface of the support so as to arrange the first guiding element at a fixed position relative to the support;

passing the first guiding element in the transport direction along a retaining unit arranged in at least one of the support sections and having the retaining unit block the movement of the leading guiding element in the opposite direction;

further moving the disconnected first guiding element and the pouch containers carried therein in the transport direction to a discharge position.

Preferably moving the disconnected first guiding element to the discharge position comprises:

displacing the disconnected first guiding element further in the transport direction;

rotating the displaced first guiding element towards the discharge position.

The method may further comprise repeating the gripping, displacing, and disconnecting until all guiding elements of the assembly have been disconnected from each other.

Preferably the method comprises applying a pulling force on the gripped first guiding element to displace the first guiding element in a transport direction.

Preferably the method comprises applying a translational movement to the first guiding element to displace the guiding element from the other guiding elements and then applying a rotational movement to the first guiding element to transport the first guiding element to the discharge position.

Preferably the method comprises changing the orientation of the guiding element with pouch containers from a first orientation wherein the pouch containers rest on the guiding element to a second orientation wherein the pouch containers suspend from the guiding element.

Preferably the method comprises positioning the gripped and displaced first guiding element relative to the movable wedge of a disconnection unit by placing the first guiding element against one or more abutment elements, preferably comprising retracting the abutment elements after the first guiding element has been disconnected from its neighbouring guiding element.

Preferably the method comprises applying a lateral pushing force in the lengthwise direction on the first guiding element in order to shift the first guiding element over a predefined distance in a lateral direction (Pi), the distance preferably being in the range of 1-2 cm; and/or applying an axial pushing force in the transport direction perpendicular to the lengthwise direction of the first guiding element on a free end of the first guiding element, thereby causing the first guiding element to pivot over a predefined angle ($\alpha$), wherein the predefined angle ($\alpha$) preferably is in the range of 1-10 degrees.

Further characteristics of the present invention will be elucidated in the accompanying description of various preferred embodiments thereof. In the description reference is made to the annexed figures.

FIG. 1 is a cut-away side view in perspective of an example of a guiding element wherein a spouted pouch container can be arranged;

FIGS. 8A-8J are schematic views of the operation of the gripping unit, in respective stages of the discharge process;

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

As will be apparent to those of skill in the art upon reading this disclosure, each of the individual embodiments described and illustrated herein has discrete components and features which may be readily separated from or combined with the features of any of the other several embodiments without departing from the scope of the present invention. Any recited method can be carried out in the order of events recited or in any other order which is logically possible.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

According to an aspect the method and apparatus are configured to receive a number of elongated guiding elements that have been loaded with (empty) spouted pouch containers (herein also shortly referred to as pouches) and to present the individual elongated guiding elements to a further handling station, for instance a handling station including a filling machine for filling the individual spouted pouches with content.

Figure 2B:
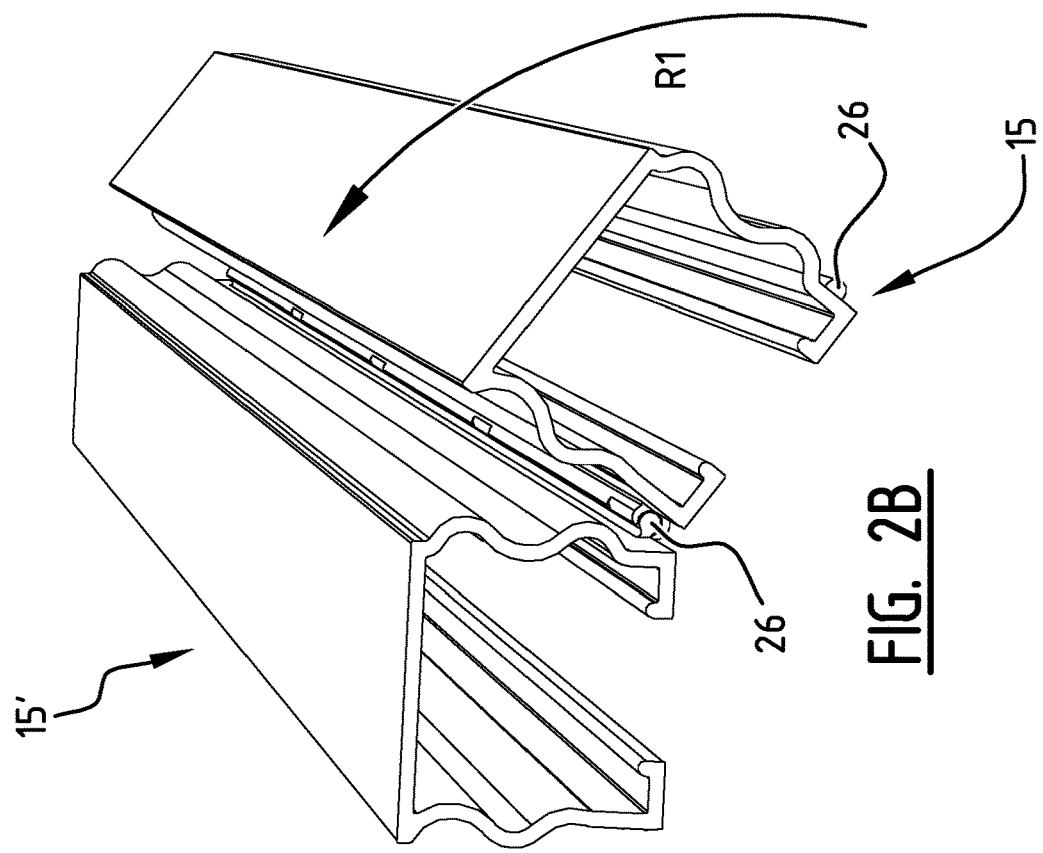
FIG. 2B is a side-view in perspective of two example guiding elements of FIG. 1, in connected (coupled) position.
Figure 2A:
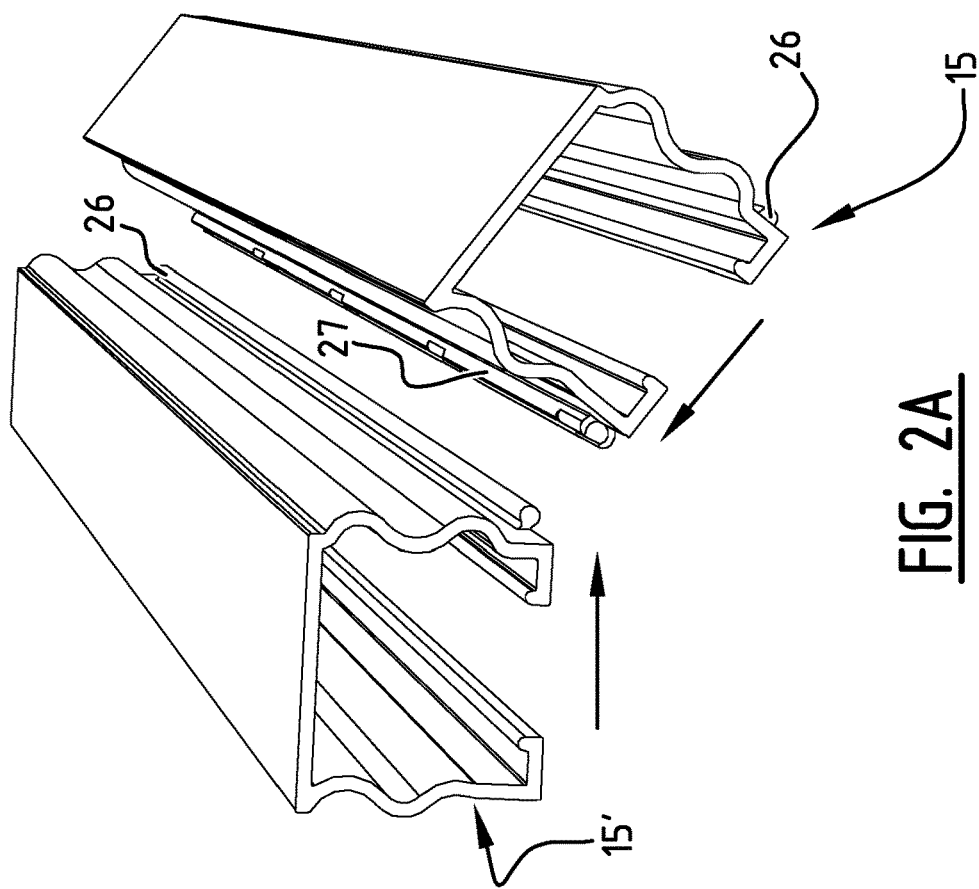
FIG. 2A is a side-view in perspective of two example guiding elements of FIG. 1, in disconnected (decoupled) position.

Spouted pouches and guiding elements are known as such, for instance from document WO 2015/128427 A1 by the same application, the content of which is incorporated herein by reference. As described in WO 2015/128427 A1 and as shown in FIGS. 1, 2A and 2B, a spouted pouch container 1 generally comprises a front wall 2 and a back wall 2', both walls being made of thin, flexible film material, preferably plastic film material. The walls 2, 2' are sealed along their circumferential edges 3 to form a package for flowable products, for example foodstuff, cosmetics, medicines, etc. In the upper edge of the pouch 1 a dispensing element, herein also referred to as a (dispensing) spout 4, is arranged. Referring to FIG. 1 spout 4 of the pouch container 1 comprises an elongated dispensing tube 8. The upper end of the dispensing tube 8 is provided with thread windings 10 for attaching a removable end cap (not shown) on the pouch container 1 after it has been filled. The lower end of the dispensing tube 8 extends through the upper circumferential edge 3 and extends into the interior thereof so that the dispensing tube 8 may provide a fluid connection between the interior of the pouch and its surroundings so that the content of the pouch may be dispensed when the end cap is removed. The dispensing tube 8 is provided with two lateral elements which serve to attach the pouch container 1 to a guiding element 15. More specifically, the dispensing tube 8 comprises to this end an upper flange part 11 and a lower flange part 12.

Guiding rail or guiding element 15 is an elongated section comprising an upper section part 16, a first section side part 17 and a second section side part 18, both section side parts extending roughly orthogonally with respect to the upper section part 16. At the free ends of the section side parts 17, 18 a slotted carrier part for carrying the spout of a spouted pouch is provided.

The carrier part comprises inwardly extending section flanges 19, 20 forming a slot between the free ends of the flanges. The distance ($d_1$) between the section flange 19 of the section side part 17 and section flange 20 of the section side part 18 is slightly larger than the distance between upright walls 14,23 of the spout 4 and smaller than the width of the upper flange part 11 of the spout 4. Furthermore the section flanges 19, 20 are provided at their respective outer ends with longitudinal ridges 21, 22 along which the upper flange part 11 of the dispensing element (spout 4) of the pouch 1 can be slid. The distance between the upper flange part 11 and the lower flange part 12 of the spout 4 is slightly larger than the distance $d_2$ between the top and bottom of a longitudinal ridge 21,22 and such that the longitudinal ridges 21, 22 are properly maintained between the upper flange part 11 and lower flange part 12. Therefore the pouch 1 can be moved easily into the guiding element 15 by sliding the spout 4 smoothly (in direction $P_1$) to be stably maintained within the guiding element 15 by the both flange parts 11, 12 of the spout 4 and the section flanges 19, 20 of the guiding element 15. The number of pouch containers 1 that can be arranged in the guiding element 15 depends amongst others on the length of the guiding element 15 and the dimensions of the respective spouts 4 of the pouches. As a not limiting example a typical 20 guiding element may carry between 20 and 60 pouch containers.

Referring to FIGS. 2A and 2B, two or more guiding elements 15 can be connected (i.e. coupled) to each other to form an assembly of interconnected guiding elements. The first section side part 17 of a guiding element 15 may comprise one or more outwardly extending flanges forming one or more male coupling elements 26. Similarly the second section side part 18 of the guiding element 15 may comprises one or more female coupling elements 27. The male and female coupling elements 26, 27 extend along at least a substantial part of the length of the guiding element 15 and are dimensioned in such a way that the male coupling element 26 of a first guiding element 15 can be inserted (FIG. 2A) into the female coupling element 27 of a second guiding element 15' to mutually connect (FIG. 2B) the first and second guiding elements. Similarly, interconnected guiding elements can also be disconnected from each other, for instance by removing the male coupling element 26 from the female coupling element 27. This can be accomplished by shifting the guiding elements relative to each other or by driving a decoupling element, such as a wedge, between the guiding elements, as will be explained later.

Figure 3:
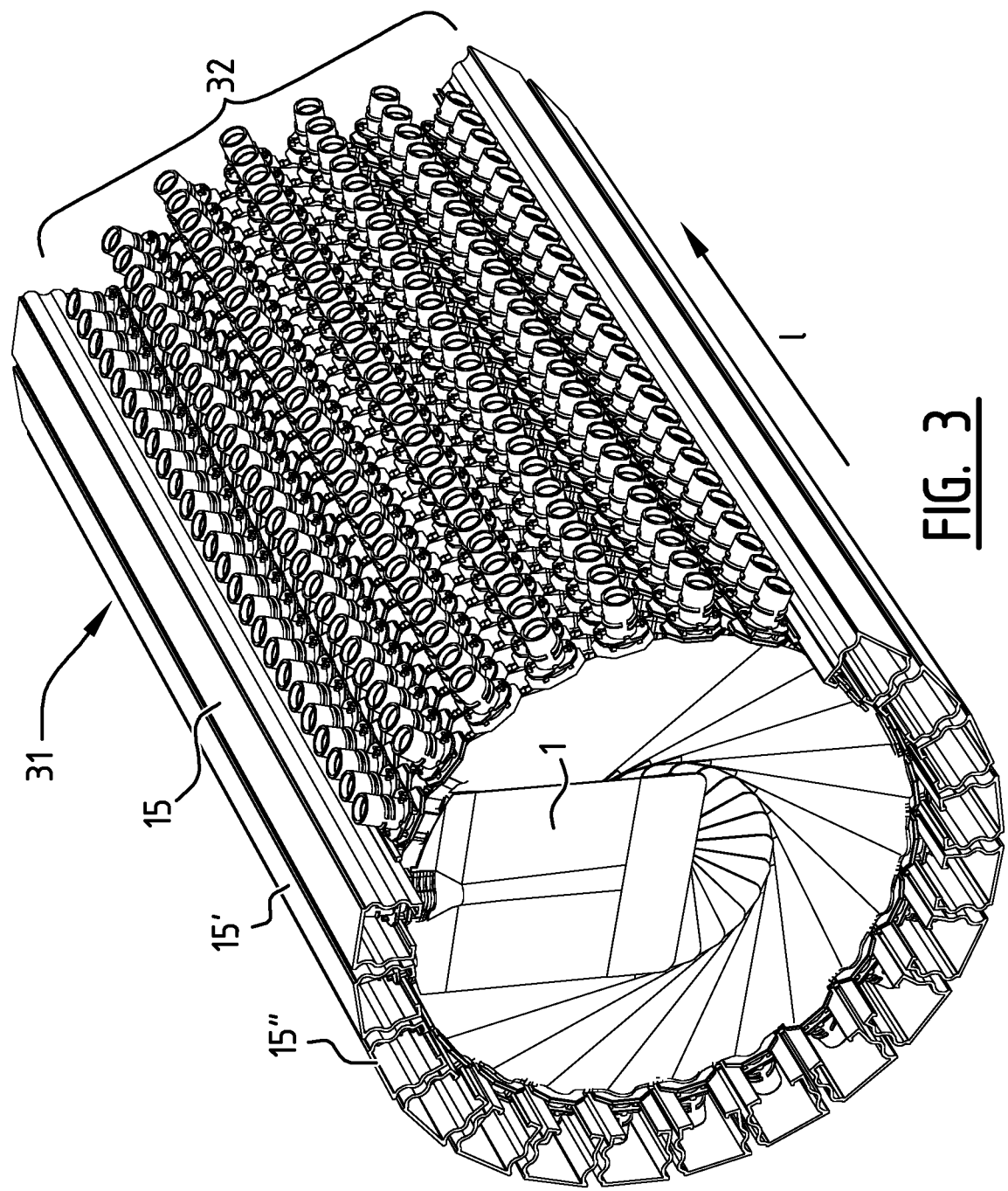
FIG. 3 is partly cut-away side-view in perspective of an assembly of guiding elements, in tubular arrangement.
Figure 4:
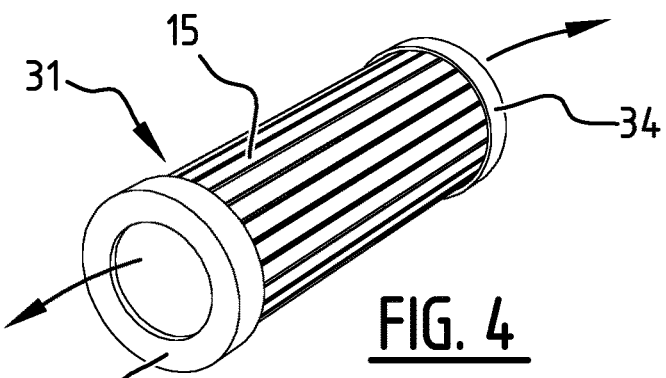
FIG. 4 is a side-view in perspective of the tubular assembly of FIG. 3, including the end caps attached to both outer ends of the assembly.
Figure 6:
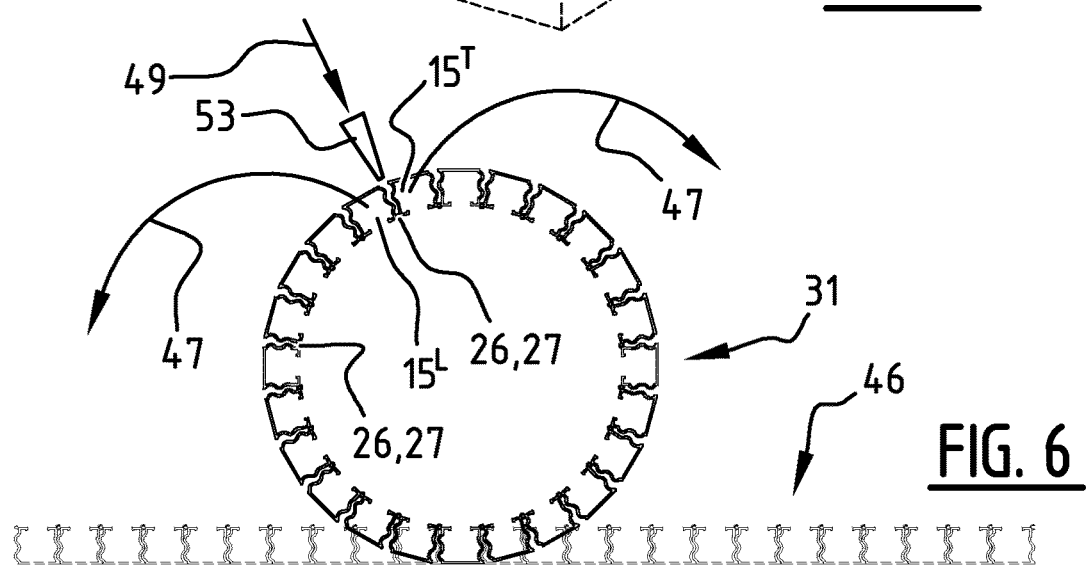
FIG. 6 is a schematic view of the guiding element assembly, both in a folded, tubular arrangement and in an unfolded, flat arrangement.
Figure 7:
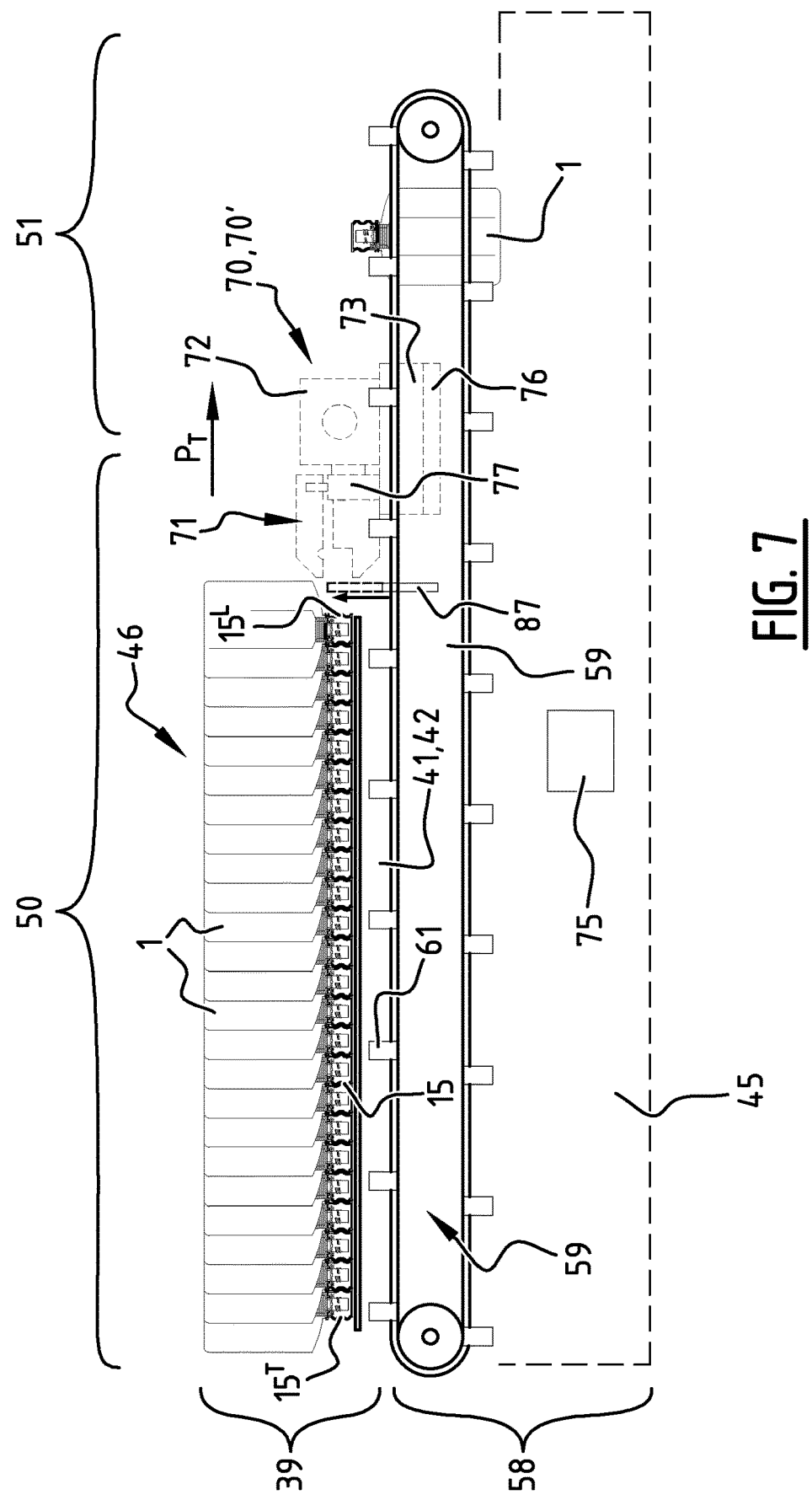
FIG. 7 is a side view of the embodiment of a discharge apparatus of FIG. 5.

The coupling elements 26, 27 are further configured to connect two or more parallel guiding elements 15, 15', while still allowing the guiding elements 15,15' to pivot ($R_1$, FIG. 2B) relative to one another. Since interconnected guiding elements may still be pivoted relative to each other, they can be positioned in different arrangements. For instance, the guiding elements may be positioned or folded into a tubular arrangement 31, as is shown in FIGS. 3 and 4. The guiding elements 15 in tubular arrangement form an enclosed interior space or interior 32 wherein the pouch containers 1 can be safely stored, as will be discussed later. The guiding elements 15 folded into the tubular arrangement may also be unfolded by pivoting them to a generally flat arrangement wherein the guiding elements 15 all extend in one flat plane, as can be seen in FIGS. 6 and 7. FIG. 6 shows the assembly of interconnected guiding elements 15 both in the folded tubular arrangement and in an unfolded, flat arrangement. FIG. 7 shows the assembly of interconnected guiding elements 15 in a flat arrangement, when placed on a support and when carrying a large number of pouch containers 1.

FIG. 3 shows the a number of guiding elements 15,15',15" arranged in a tubular arrangement 31 wherein the interior 32 of the tubular arrangement 31 is completely filled with a large number of pouches 1. FIG. 3, which is a partly cut-away view wherein for purpose of illustration only a number of guiding elements have been omitted to allow a view on the interior 32 of the tubular assembly, shows that the interior 32 of the tubular arrangement 31 of guiding elements 15 has been filled with pouch containers 1. More specifically the pouch containers 1 are arranged to extend in a generally helical trajectory along the length (l) of the guiding elements 15. In other words, in order to optimize the use of the space available in the interior 32 of the tubular arrangement 31, the pouch containers 1 may be arranged in the tubular arrangement in angularly displaced positions.

The guiding elements 15 arranged in the tubular arrangement 31 of FIG. 3 are self-maintaining (or self-supporting)

so that the guiding elements 15 can be coupled in such a manner, that they are mutually supported and that they remain in their tubular arrangement 31 without needing any further means. In other embodiments, for instance in the embodiment shown in FIG. 4, the guiding elements 15 have one or more additional retaining means to more accurately retain the guiding elements 15 in the tubular arrangement 31, for instance a piece of stretchable foil material wrapped around the tubular arrangement 31, a number of straps strapped around the tubular arrangement 31, and/or one or more removably attached end caps or covers 33,34 positioned at at least one of the ends of the tubular arrangement 31 to keep the guiding elements 15 in their tubular arrangement 31, also in case external forces are applied to the guiding elements 15, for instance during transport. In case use is made of an additional support, the guiding elements 15 may also be of a type that does not have the means to connect to each other. In this type of guiding elements 15 the coupling elements 26,27 may have been left out.

When the pouch containers 1 are arranged in the interior 32 of the tubular arrangement 31 of guiding elements 15 and, optionally, the additional retaining means have been attached to completely seal off the interior 32, the assembly is ready to be stored and/or to be transported.

After transportation of the tubular arrangement 31 to its destination, for instance the factory where the pouch containers 1 are handled in further handling stations such as filling stations, the guiding elements 15 and the (empty) pouch containers 1 contained therein need to be presented in a proper, fast and efficient manner to the further handling stations (for instance, filling machines).

Figure 5:
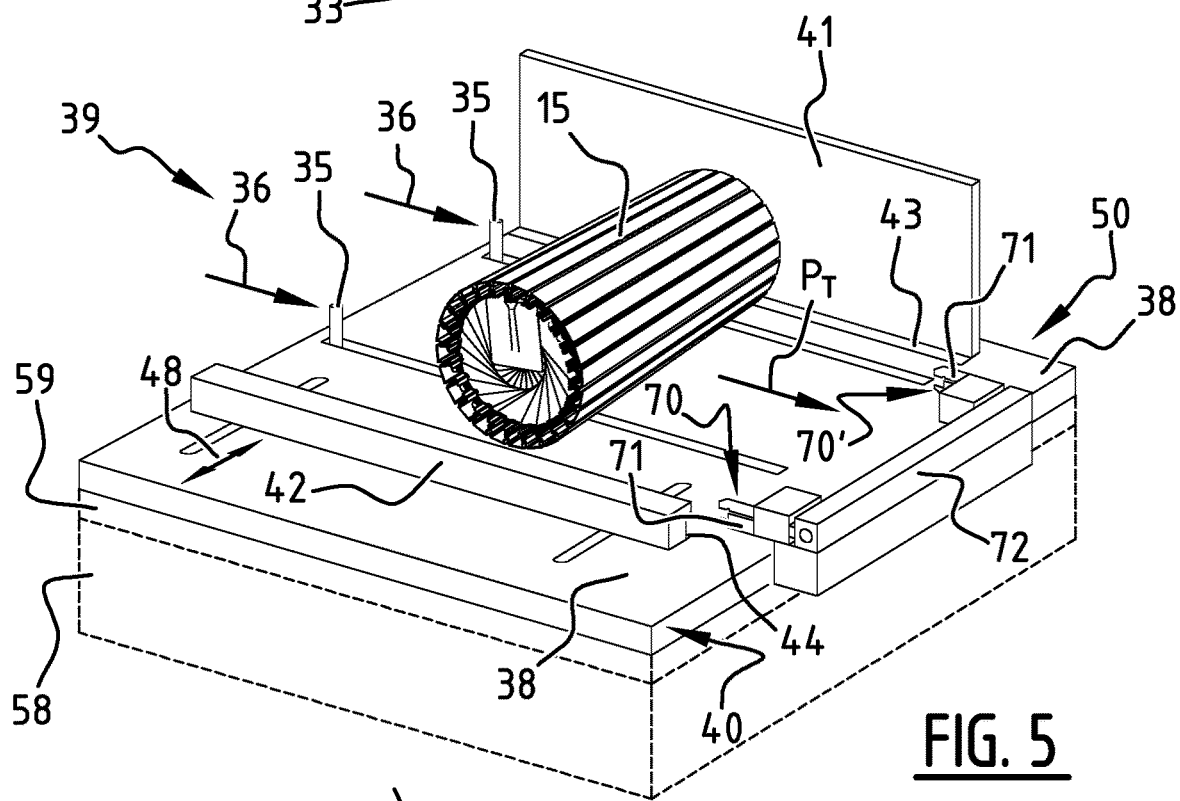
FIG. 5 is a schematic side view showing partially an embodiment of a discharge apparatus, placed on top of an existing handling station.

Once a tubular arrangement 31 has arrived at the further handling station, the additional retaining means are removed first. This may be done manually. The outer ends of the tubular arrangement 31 may then be placed in a supply portion 50 of discharge apparatus 39 according to an embodiment of the present disclosure, as is shown in FIG. 5. The discharge apparatus 39 may comprise a support 40, for instance a curved or flat support plate carried by a support frame 45 (cf. FIG. 7).

The support frame 45 may be formed by a part of the further handling station 58, for instance by a horizontal conveyor 59 of the handling station 58 in which individual guiding elements 15 can be placed and transported towards a filling machine. Additionally or alternatively, the support frame 45 may be part of the discharge apparatus 39 itself. The support frame 45 in this case is configured to autonomously support the support 40 and other parts of the discharge apparatus 39 in a stable manner on the floor.

Various types of further handling stations are available on the market. The handling stations have in common that they comprise a conveyor section including a horizontal conveyor in which the individual guiding elements can be placed and subsequently transported towards a filling section where the pouch containers are guided out of the guiding elements so that they may be filled with content. In an example embodiment the conveyor section comprises a horizontal chain track. The chain track is comprised of two driven parallel chains positioned at a mutual distance slightly larger than the length (l) of a guiding element and having chain pins extending horizontally inward to such an extent that the ends of each of a number of individual guiding elements can be placed manually and one-by-one on one or more pins of the respective chains. When the chain is driven the respective guiding elements may be moved towards the filling station.

In the embodiment shown in the FIG. 5 the support plate 38 of the support 40 of the discharge apparatus 39 is placed on top of the further handling station 58. More specifically, the processing discharge apparatus 39 is an add-on unit that is configured to be placed on top of a horizontal chain track type conveyor 59 of an existing handling station 58. However, in other embodiments the processing discharge apparatus 39 is an add-on unit configured to be placed on a different type of handling station or a stand-alone processing discharge apparatus placed on its own support frame.

The support plate 38 has two upright parallel elongated support sections 41,42. These elongated support sections 41, 42 can be moved in lateral directions (see arrow 48) to adjust their lateral position so that the guiding elements 15 can be properly guided between elongated support sections 41,42, irrespective of their length (l). Each of the elongated support sections 41,42 comprises at least a flat support surface 43,44 on which an outer end of the tubular arrangement 31 can be supported and on which the guiding elements 15 can be slid in the transport direction, for instance towards a further handling station 58. In the shown embodiments the flat support surfaces 43,44 extend in a generally horizontal direction, although differently shaped and/or differently oriented support surfaces are conceivable as well.

As mentioned above, in embodiments of the present disclosure, the processing discharge apparatus 39 is placed on a chain type conveyor 59. The support 40 may be placed on the respective housings of the first and second chain. In other embodiments, the first elongated support section 41 is directly placed on the housing of the first chain and the second elongated support section 42 is directly placed on the housing of the second chain. In the latter embodiment the first and second elongated support sections 41,42 have respective support surfaces 43,44 aligned with the housings of the first and second chains.

As mentioned above, the outer ends of the guiding elements 15 may rest on the support surfaces 43,44. The support surfaces 43,44 may carry the tubular arrangement 31 (FIG. 5) before 15 unfolding. The support surfaces 43,44 may also carry the unfolded, flat arrangement 46 of guiding elements 15. The guiding elements 15 are carried by the support surfaces 43,44 in such a manner that they remain supported when they are transported (for instance pushed and/or pulled) from the supply portion 50 of the processing discharge apparatus 39 towards a discharge portion 51.

Once the tubular arrangement 31 is positioned on the support surfaces 43, 44 of the support sections 41 in the supply portion 50 of the processing discharge apparatus 39, the tubular assembly 31 is opened by disconnecting (at least) two of the interconnected guiding elements 15. Disconnecting two (arbitrary) guiding elements may be accomplished by forcing the male coupling element 26 of a first guiding element $15^L$ out of the female coupling element 27 of a second coupling element $15^T$ (arrow 49). This may for instance be accomplished manually or by using a suitable device by placing a wedge 53 between neighbouring guiding elements $15^L,15^T$ and moving the wedge 53 along the length of the guiding elements $15^L,15^T$.

The opened tubular arrangement 31 is then unfolded (cf. arrows 47, FIG. 6) by pivoting the guiding elements from the tubular arrangement 31 to a flat arrangement 46, as is elucidated in FIGS. 6 and 7. FIG. 7 is a side view of one of the discharge apparatus 39 that has been placed on an existing conveyor 59 of a further handling station 58. The figure shows a plurality of interconnected guiding elements 15 (herein also referred to as a mat or assembly of interconnected guiding elements) that have been placed in the supply portion 50 of the processing discharge apparatus 39 and that have been unfolded from the tubular arrangement 31 to a straight or flat arrangement 46. Since the guiding elements 15 are not positioned on the chain pins 61 of the horizontal conveyor 59, the guiding elements must be transported towards the discharge portion 51 by different means.

To this end the processing discharge apparatus 39 may comprise a pushing mechanism for pushing the guiding elements 15 towards the discharge position, a pulling mechanism for pulling one or more guiding elements 15 (and the guiding elements connected to the first guiding element) or both a pushing mechanism and a pulling mechanism.

FIG. 5 shows an embodiment of a pushing mechanism for pushing the guiding elements 15 in the longitudinal direction (i.e. in transport direction $P_T$). Once the tubular arrangement 31 has been opened and unfolded, pushing forces 36 may be exerted by one or more pushers 35 on the trailing guiding element $15^T$ so as to push all guiding elements 15 at the same time in the transport direction $P_T$. The one or more pushers 35 can be spring loaded pushers. The pushers may be configured to constantly urge the trailing guiding element $15^T$ and all other guiding elements 15 in the direction 36 of one or more gripping units 70,70'. The constructions and operation of the one or more gripping units 70,70' will be described hereafter. The pushing mechanism can be used in situations wherein the guiding elements are interconnected or wherein the guiding elements are not interconnected.

FIGS. 5 and 7 also show an embodiment of a pulling mechanism. The pulling mechanism can also be used in situations wherein the guiding elements 15 are interconnected or wherein the guiding elements 15 are not interconnected. The embodiment includes at least one gripping unit 70 for gripping at least one of the guiding elements 15 and applying a pulling force on the guiding element(s) 15. In a preferred embodiment two gripping units 70, 70' are provided, one unit positioned close to the first support section 41 and one positioned close to the second support section 42 so as to apply a more evenly distributed pulling force on the guiding element(s). Each gripping unit comprises at least one gripper 71 that is configured to be actuated by an actuator 77 including an electric motor for controlled gripping and releasing of a guiding element 15. The gripping unit 70 further comprises a rotatable arm 72. To the rotatable arm 72 only one gripper 71 may be connected, but in other embodiments two or more grippers are connected to the rotatable arm 72. In the embodiment of FIG. 5 the gripping units 70, 70' comprise one common rotatable arm 72, the arm being provided with two grippers 71. In still other embodiments, for instance the embodiments shown in FIGS. 14A and 14B, grippers $71^1$ and $71^2$ are connected at the ends of a rotatable arm 102. The rotatable arm 72, 102 may be rotatably mounted to a movable carrier 73 that is attached to the frame 45. The movable carrier 73 can be moved linearly in transport direction ($P_T$) or in opposite direction by means of a drive unit 76, for instance including an electric motor. Both the actuator 77 and the drive unit 76 are controlled by a common controller 75 shown schematically in the drawings, such as a computer or similar electronic device.

The gripping unit(s) 70 is (are) configured to give the respective gripper 71 a rotational and translational movement so as to enable gripping of a guiding element and move the gripped guiding element 15 towards the discharge position at the end of the processing discharge apparatus 39. The gripping unit 70 is further configured to move the assembly of interconnected guiding elements 15 in transport direction ($P_T$) (i.e. pull the entire assembly of all interconnected guiding elements 15 in the transport direction), disconnect—in cooperation with a disconnection unit 80 to be described hereafter—the leading guiding element $15^{1'}$ (i.e. the first guiding element 15 in the assembly of guiding elements, seen from the viewpoint of the discharge portion 51) from the remainder of the interconnected guiding elements 15, move the disconnected leading guiding element 15 further in the transport direction towards a discharge position, for instance a discharge position close to a filling station, and rotate the leading guiding element 15 in order to arrange the pouch container 1 in a reverse orientation (see FIGS. 8I and 8J), i.e. in an orientation wherein the pouch containers 1 suspend from the guiding element 15), so as to pass the guiding element 15 over to the further handling station (wherein the pouch containers may be directly filled in a filling machine, for instance). More generally, the discharge apparatus 39 is able to change the orientation of the guiding element 15 with pouch containers 1 from a first orientation wherein the pouch containers 1 rest on the guiding element 15 to a second orientation wherein the pouch containers 1 suspend from the guiding element 15.

Figure 9:
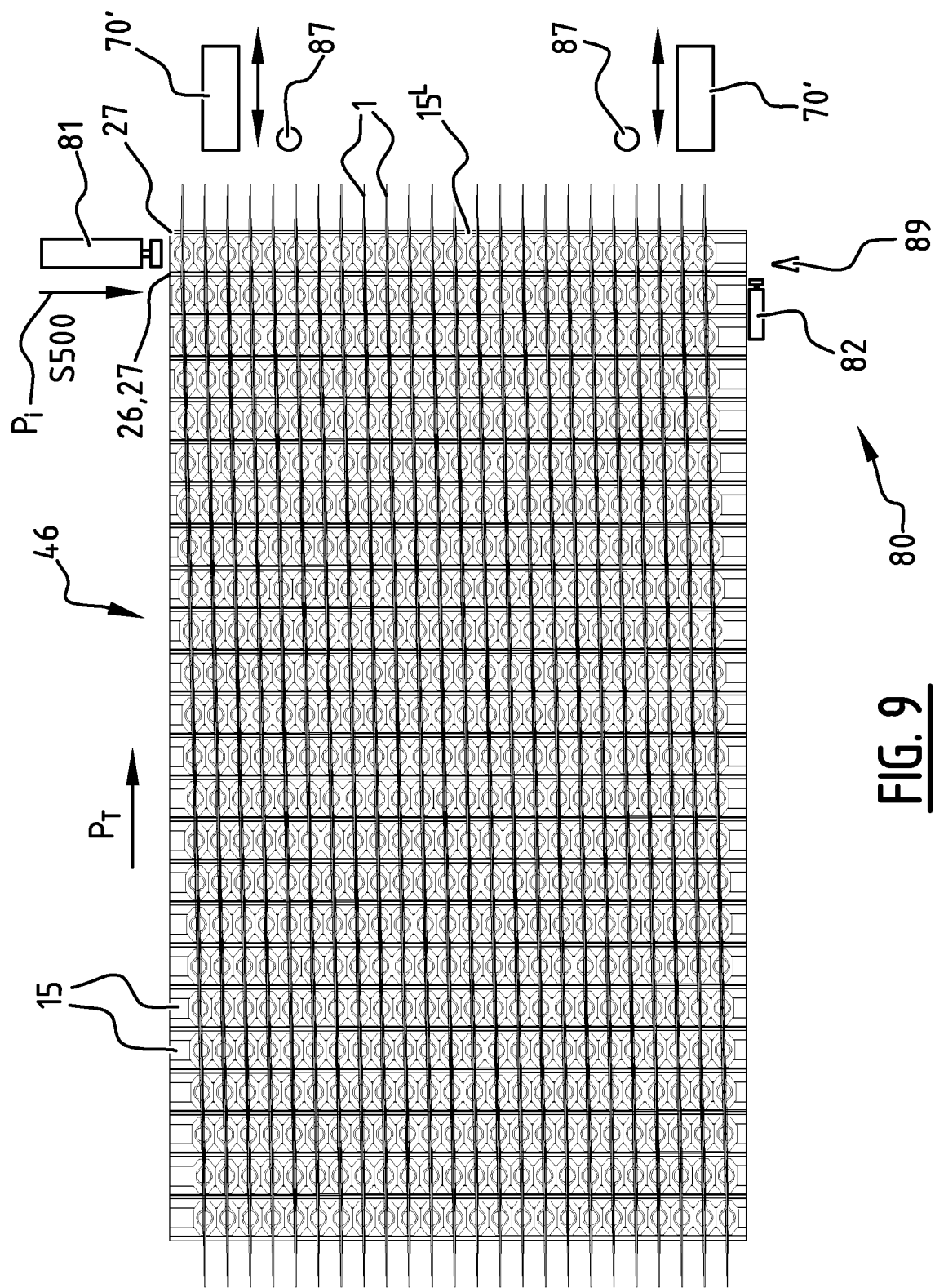
FIGS. 9-13 are top views of a flat assembly of guiding elements placed on an embodiment of the discharge apparatus, in respective stages of the discharge process.
Figure 10:
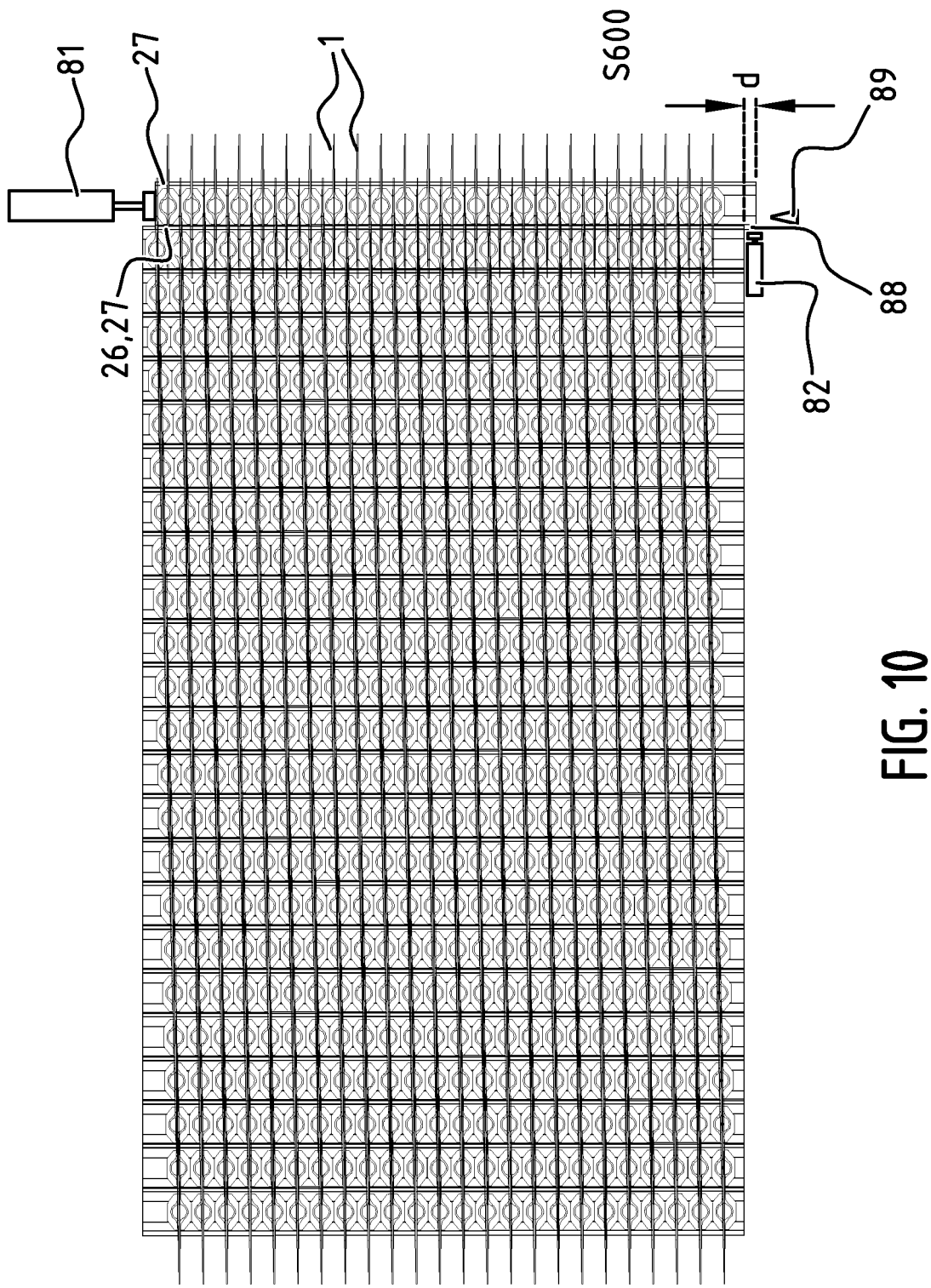
Figure 11:
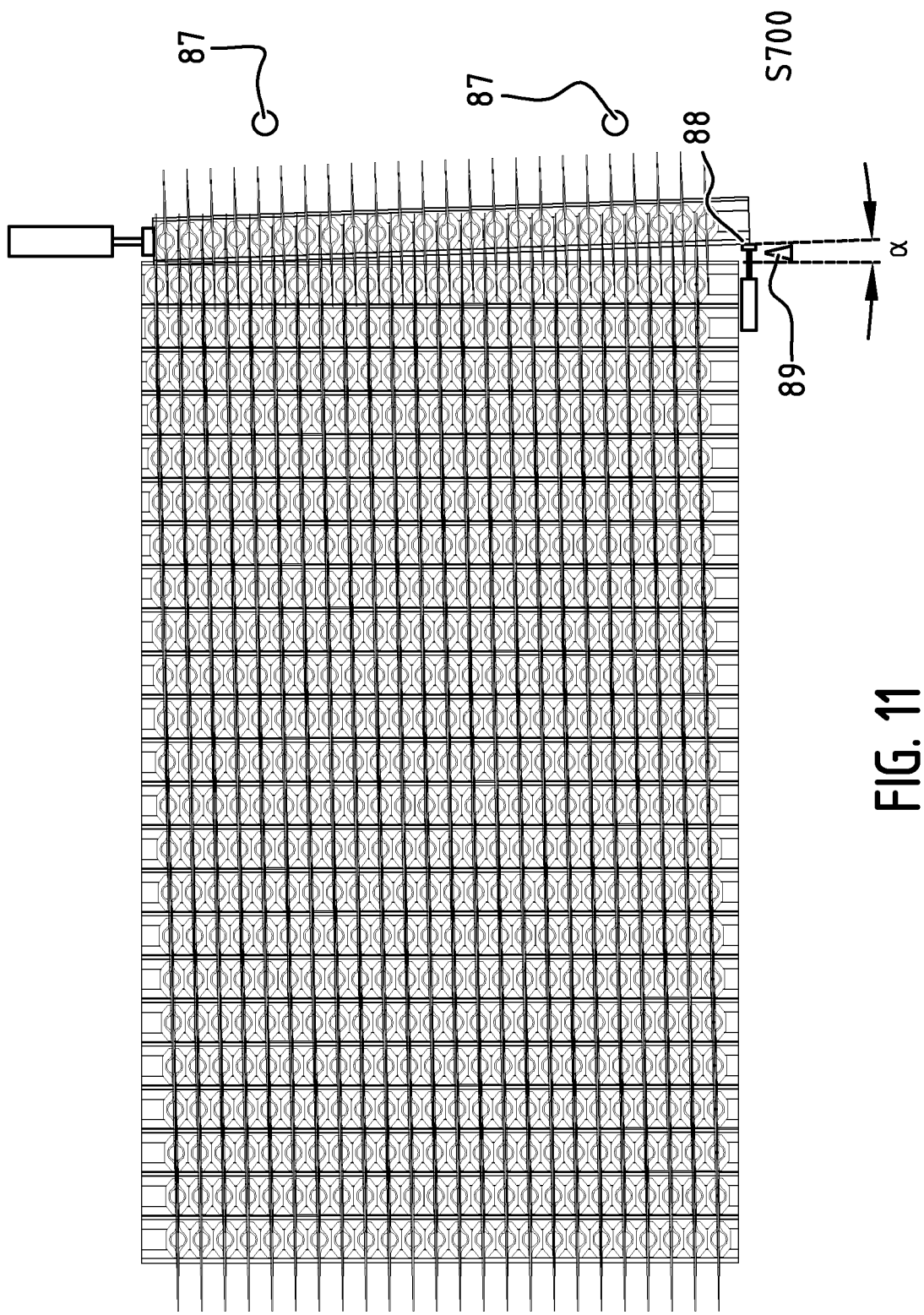
Figure 12:
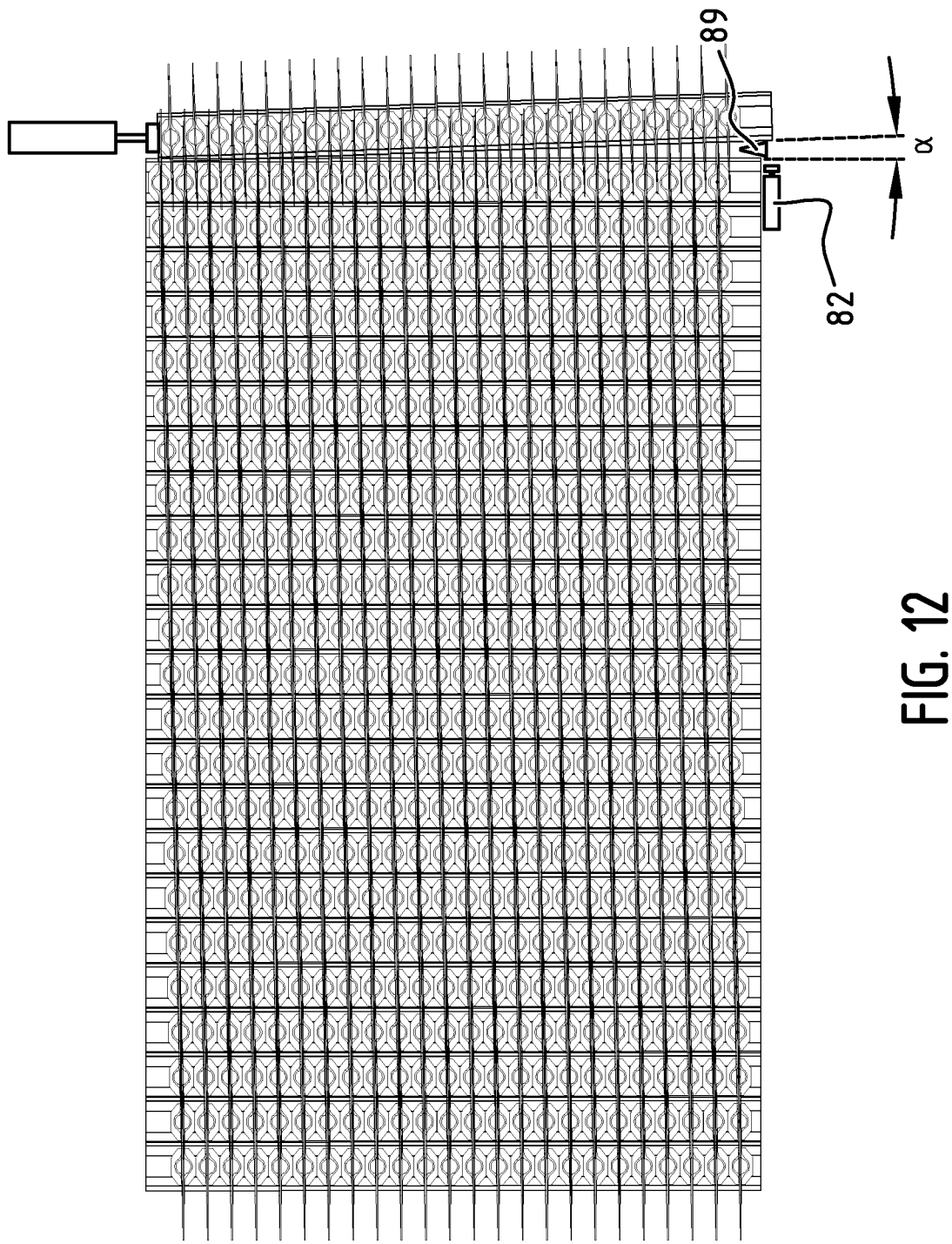

FIGS. 8A-8J provide schematic side views and FIGS. 9-13 top views illustrating a number of steps for processing the assembly of interconnected guiding elements 15 placed on the discharge apparatus 39 according to embodiments of the present disclosure. FIG. 9 shows a top view of the assembly of guiding elements 15 in a flat arrangement 46 on the support sections 41, 42 of the discharge apparatus 39. The assembly consists of 24 guiding elements 15, each guiding element 15 carrying 24 spouted pouch containers 1. Gripping units 70,70' have been arranged close to the outer ends of the leading guiding element $15^L$, at positions slightly inward relative to the ends of the earlier-mentioned chain pins 61 of the chain type conveyor 59. The start position of the grippers 71 of each of the gripping units 70, 70' corresponds to the position shown in FIG. 8A.

In a first step (S100, FIG. 8B) the drive unit 76 of the carrier 73 drives the gripper 71 of each of the gripping units 70,70' to move in a direction 78 opposite to the transport direction $P_T$ until the gripper 71 reaches the first, leading guiding element $15^L$.

In a next step (S200, FIG. 8C) the actuators 77 are controlled to close the grippers 71 by moving the upper gripper element 85 thereof downward (arrow 84) towards the lower gripper element 86, thereby clamping the leading guiding element $15^L$ in the gripper 71.

In a next step (S300, FIG. 8D) the drive unit 76 of the carrier 73 causes the grippers 71 to be displaced in the transport direction ($P_T$), more specifically by a linear movement (translation) and/or a movement in horizontal direction, until the leading wall of the leading guiding element $15^L$ abuts a plurality of abutment elements. The abutment elements are configured and arranged to accurately position the gripped and displaced leading guiding element $15^L$ relative to a disconnection unit that is configured to disconnect (i.e. decouple) the leading guiding element from the next guiding element $15^M$. The abutment elements could take any shape as long as they are able to correctly position the guiding elements to allow the disconnection unit to properly disconnect the leading guiding element $15^L$. In a preferred embodiment the abutment elements are retractable abutment pins 87. These abutment pins 87 extend from the (upper) surface of the support plate 38 to perform the abutment function, but can also be fully retracted into the support plate 38 so as to allow the disconnected guiding element 15 to be displaced further, i.e. to freely pass by the position of the abutments elements 87.

During the movement of the grippers 71 not only the leading guiding element $15^L$ is displaced, but also the next guiding element $15^M$ and all further guiding elements 15 since the guiding elements 15 are still mutually coupled. In other words, in this step the entire assembly of guiding elements 15 is pulled by the gripping units 70 in the transport direction ($P_T$) until the leading guiding element $15^L$ reaches the retractable abutment pins 87.

In the next step (S400, FIG. 8E) the grippers 71 are opened by moving the upper gripper element 85 in upward direction (arrow 93) again so that the leading guiding element $15^L$ now more or less freely rests against the retractable abutment pins 87.

In the next couple of steps (S500-S700) the leading guiding element $15^L$ is automatically disconnected from the next guiding element $15^M$ (all the other guiding elements 15 remain interconnected). In step S500 (FIG. 9) a push unit, for instance a push unit 81 or a similar pushing device such as an electric motor, arranged at one side of the discharge apparatus 39 is actuated so as to apply a pushing force in order to push the leading guiding element $15^L$ in a laterally inward direction ($P_i$). The coupling elements 26,27 between the leading guiding element $15^L$ and the next guiding element $15^M$ permit the leading guiding element $15^L$ to be shifted slightly in lateral direction ($P_i$). The distance (d, FIG. 10) over which the leading guiding element $15^L$ is shifted may be as small as 1-2 cm.

Figure 13:
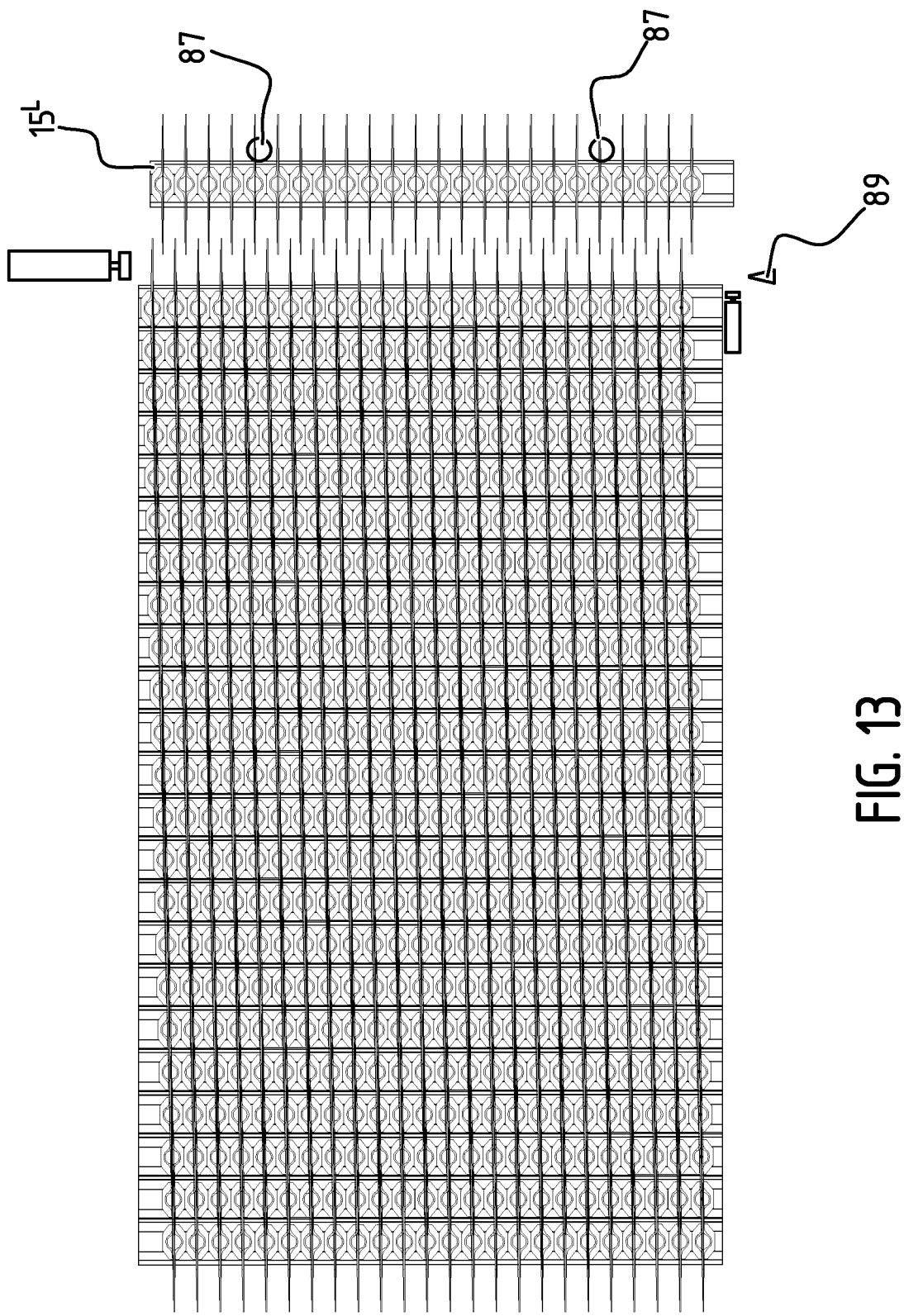

Alternatively or additionally the disconnection unit 80 may comprise a second push unit 82. The second push unit, for instance a second push cylinder or a similar pushing device such as an electric motor, in a further step (S600, FIG. 9), is able to push the leading guiding element $15^L$ in axial direction (i.e. the transport direction $P_T$) by applying an axial pushing force against a free end 88 of the leading guiding element 15% thereby causing the leading guiding element $15^L$ to pivot slightly over an angle (a, typically in the range of 1-10 degrees) to the position shown on FIG. 11. The leading guiding element $15^L$ now extends obliquely with respect to the other guiding elements 15, creating space for a decoupling element such as a wedge 89 (carried on a wedge drive unit, not shown in the figures) to be moved in lateral directions (S700, FIGS. 11 and 12) between the leading guiding element $15^L$ and the next guiding element $15^M$. The wedge 89 thereby completely detaches the leading guiding element $15^L$ from its neighbouring guiding element $15^M$, as is shown in FIG. 13. Please note that first, lateral shifting of the leading guiding elements $15^L$ by the first push unit 81 and then pivoting the same by the second push unit 82 is preferred since the shifting exposes one of the free ends 88 of the leading guiding element $15^L$ so that the second push unit 82 can more easily apply the axial force to the leading guiding element $15^L$. However, in other embodiments of the present disclosure, the first pushing unit 81 is dispensed with or is not being used. The second pushing unit 82 may be configured to apply the axial force also when there is no lateral shifting of the guiding element 15.

In the next step (S800, FIG. 8F) the retractable abutment pins 87 are retracted (i.e. moved downward) until they do no longer abut the leading guiding element $15^L$. Once the abutment pins 87 have been retracted, the gripper 71 is closed again (S800) (i.e. moved in direction 84) and then, in step S900 (FIG. 8G), the leading guiding element $15^L$ is displaced (i.e. displaced in a linear movement and/or in a horizontal movement) in the transport direction $P_T$ again. The travelled distance should be large enough to allow the gripped leading guiding element $15^L$ to be rotated upwardly in a next step (S1000) without the spouted pouch containers 1 in the leading guiding element $15^L$ to be able to interfere with the spouted pouch containers 1 of the neighbouring guiding element $15^M$.

In the next step (S1000, FIGS. 8H,8I) the rotatable arm 72 carrying the gripper 71 is rotated ($R_2$) in upward direction. In embodiments of the present disclosure the rotatable arm 72 is rotated over an angle of about 180 degrees to the pouch container discharge position shown in FIG. 8I.

In a next step (S1100, FIG. 8J) the grippers 71 are opened again thereby releasing the leading guiding element $15^L$. Depending on the orientation of the rotatable arm 52, the leading guiding element $15^L$ will keep resting in the grippers 71 until the leading guiding element $15^L$ is actually caused to be transferred to the next handling station.

In embodiments wherein the discharge apparatus 39 has been placed on top of the chain type conveyor 59 of an existing handling station 58, the pins 61 of the conveyor 59 may engage (S1200) the leading guiding element $15^L$ and push the same in a discharge direction (i.e. the transport direction $P_T$) towards the further handling station (not shown). In this embodiment the conveyor 59 is therefore used as pouch container discharge unit for finally discharging the leading guiding element $15^L$ and its spouted pouch containers 1. In other embodiments, the discharge apparatus 39 comprises a separate pouch container discharge unit configured to discharge the guiding element with spouted pouch containers 1 from the gripping units 70,70'.

Once the leading guiding element $15^L$ has been discharged, the rotatable arm 72 rotates back to the starting position shown in FIG. 8A (S1300). Steps S100-S1300 may be repeated for the next guiding element(s) $15^M$ until all guiding elements 15 of the flat arrangement 46 have been processed.

Figure 14A:
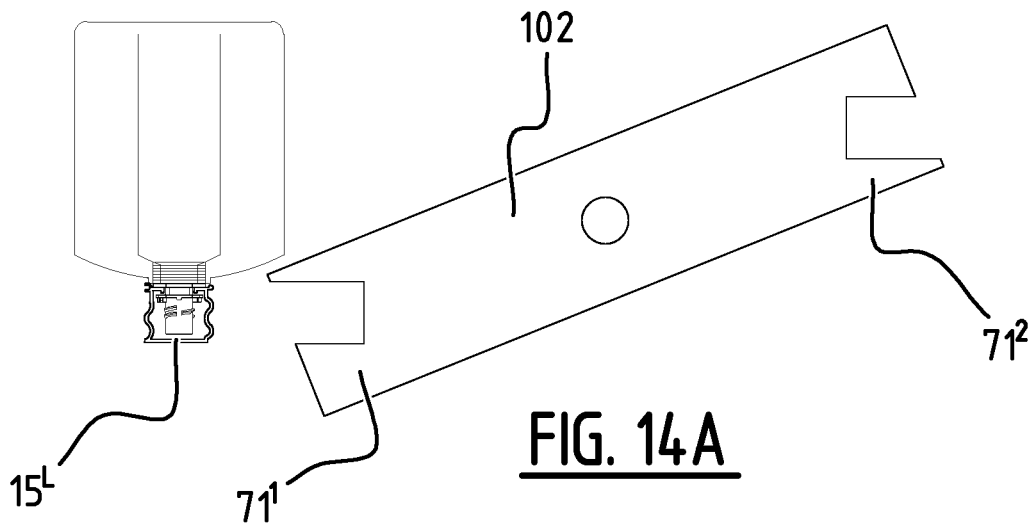
FIG. 14A-14C are schematic side views of a further embodiment of a gripping unit.
Figure 14B:
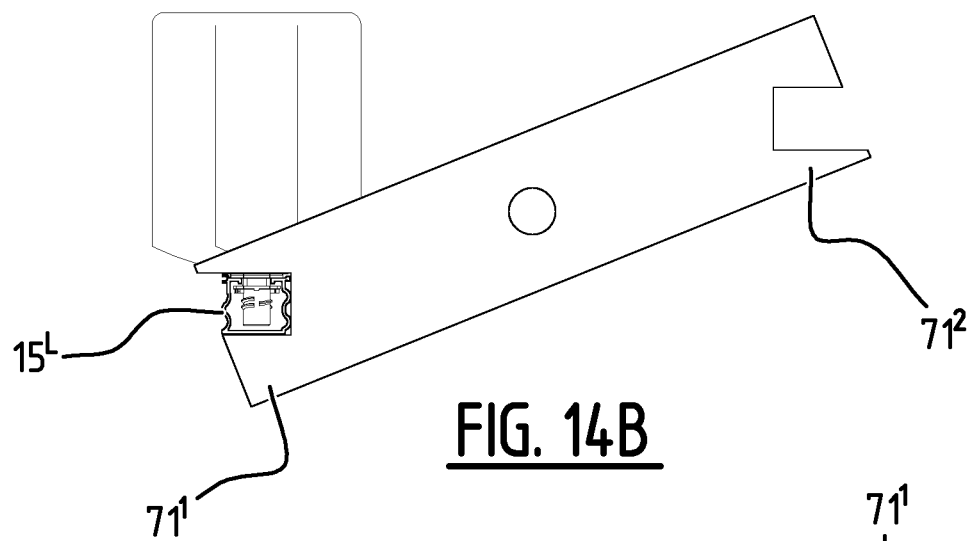
Figure 14C:
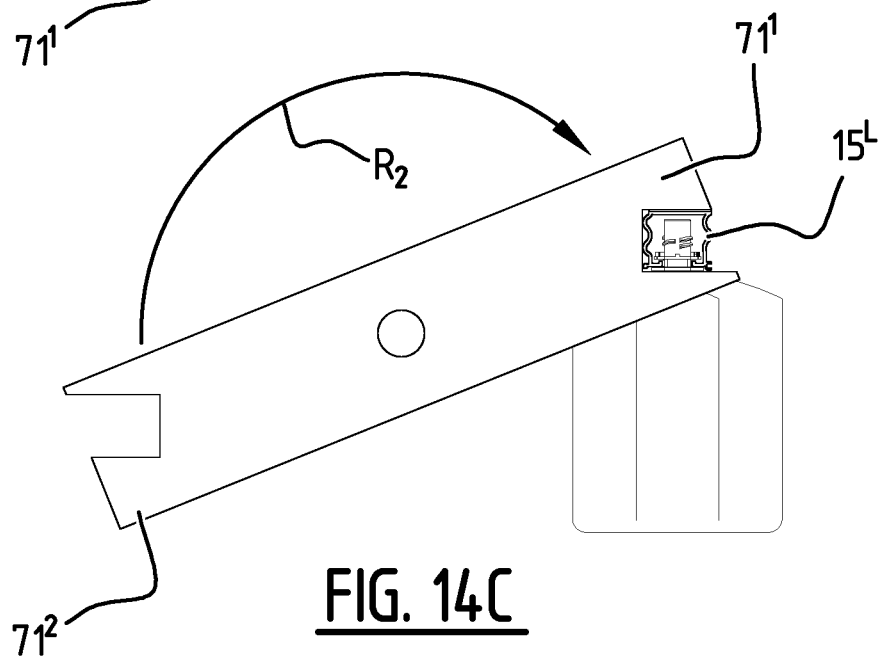

In some embodiments the gripping unit 70,70' has a single gripper 71 provided at one end of the rotatable arm 72, in other embodiments, for instance the embodiment shown in FIGS. 5,8A-8J or the embodiment shown in FIGS. 14A-14C, the rotatable arm 72,102 is provided with two grippers 71, $71^1$, $71^2$, each gripper being able to perform the operations described above (excluding step S1300. The arm 102 is rotated in one direction $R_2$ only, cf. FIG. 14C).

Figure 15:
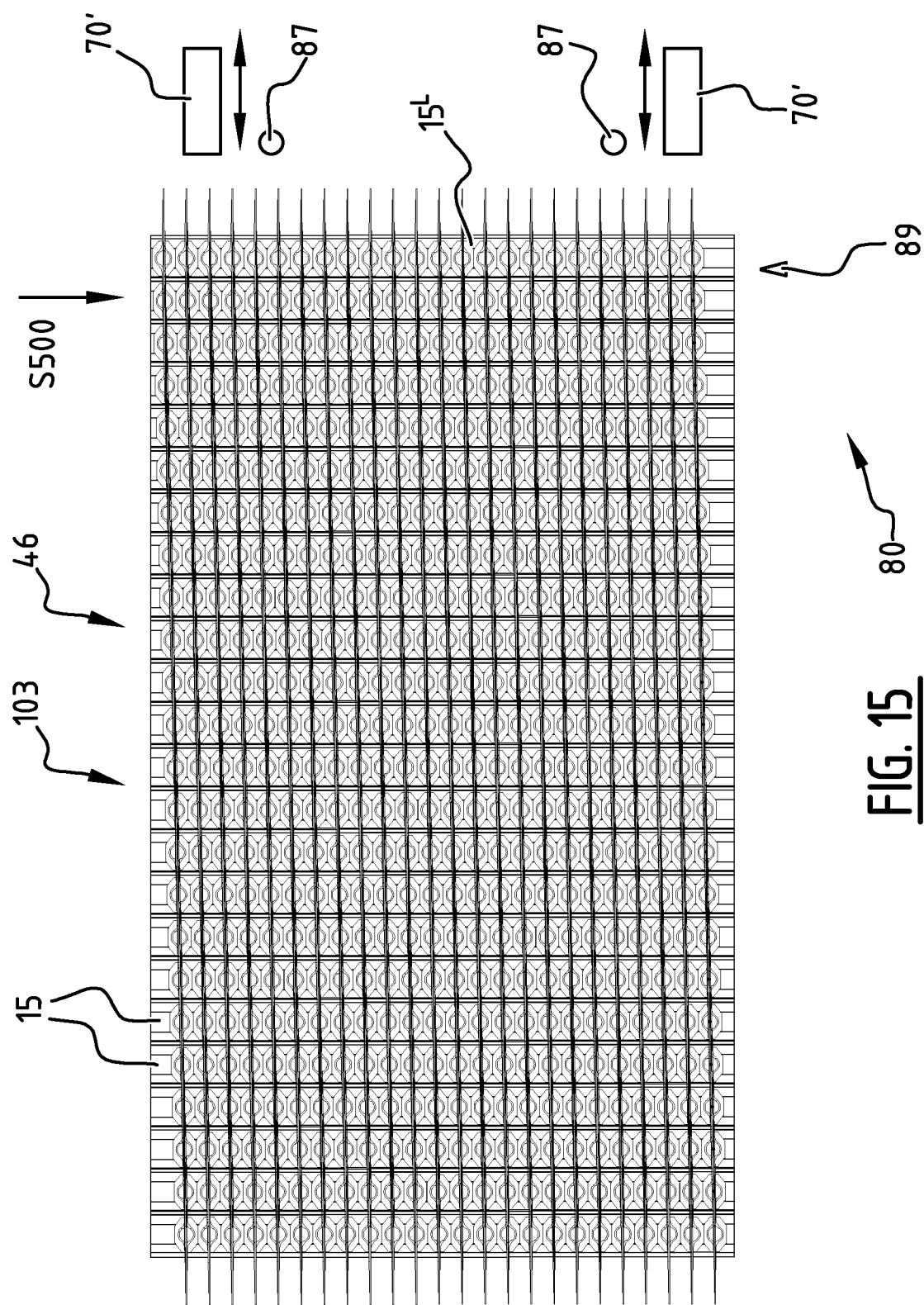
FIGS. 15 and 16 are top views of a flat assembly of guiding elements placed on a further embodiment of the discharge apparatus.
Figure 16:
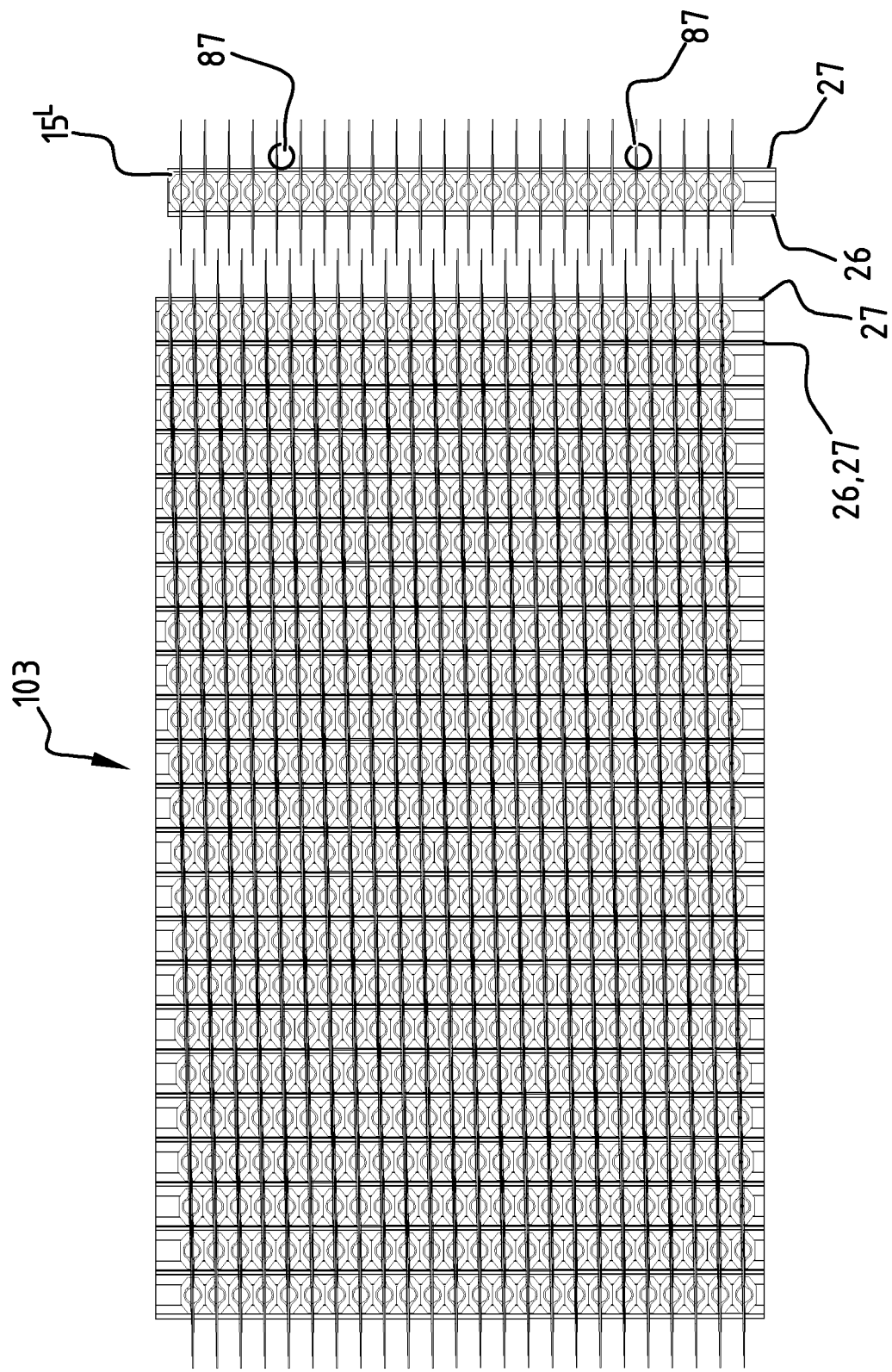

Furthermore, referring to FIGS. 15-16 another embodiment of a discharge apparatus 103 of the present disclosure is described. In this embodiment the discharge apparatus 103 the push unit 81 and 82 have been omitted (or are present, but not effectively used). This embodiment may for instance be useful when the coupling elements of the guiding elements have a slightly different configuration. For instance, in some embodiments the coupling elements 26,27 do not extend to the outer ends of the guiding element, but are absent in the end portions of the guiding elements (for instance over a distance of 5-10 cm from the respective end surfaces of the guiding elements). In these embodiments it may be possible to move the wedge 89 in between the leading guiding element $15^L$ and its neighbouring guiding element $15^M$ without needing the earlier mentioned space that was created by pushing against the leading guiding element by the push cylinders 81,82. The remaining steps of the discharge apparatus 103 are the same or similar to the steps described in connection with FIGS. 8-13.

Figure 17:
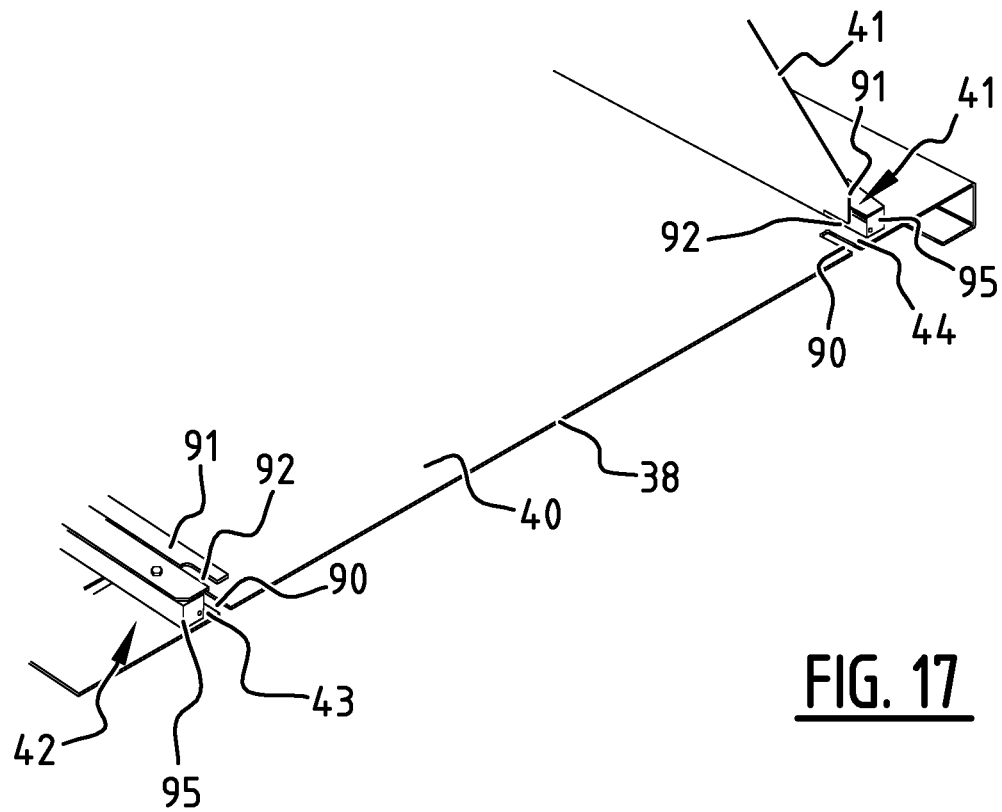
FIGS. 17-19 are side views of a further embodiment of a discharge apparatus.
Figure 18:
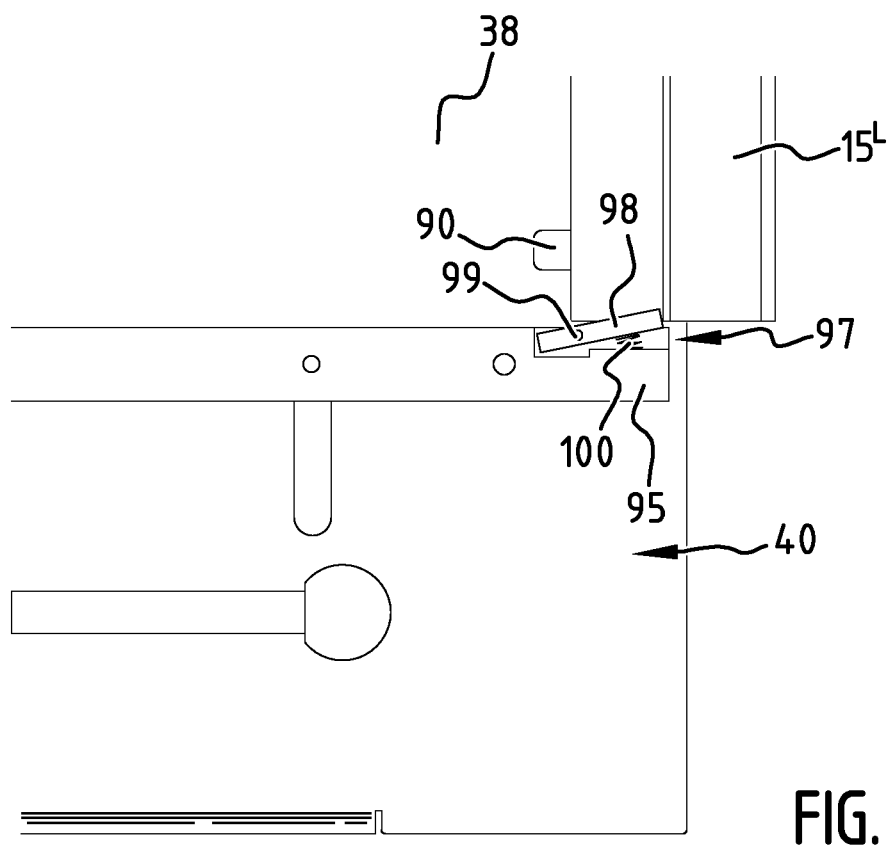
Figure 19:
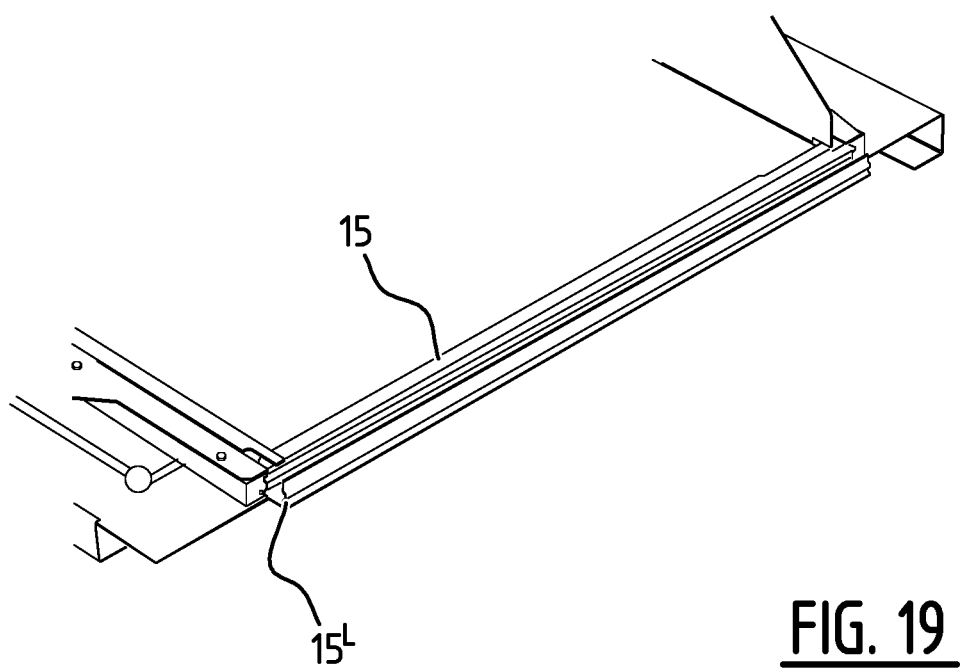

FIGS. 17-19 show a further aspect of the present disclosure. Referring also the FIG. 5, the embodiment of the discharge device 39 has a support plate 38 having two upright parallel elongated support sections 41,42. Each of the elongated support sections 41,42 comprises a side wall 95, a flat support surface 43,44, and a flat upper surface 91. The surfaces 43,44,91 are configured to guide the guiding elements 15 to allow them to be moved smoothly in the transport direction. In the flat upper surface 91 and the support plate 38 respective openings 92,90 are formed to allow respectively the upper gripper element 85 and the lower gripper element 86 of the gripper to pass. Referring to FIG. 18 a retaining unit 97 is shown which is configured to retain the first/leading guiding element $15^L$ in place after this guiding element $15^L$ has been placed against the earlier-mentioned abutment elements 87. The retainer unit 97 comprises a retainer element 98 accommodated in a recess of the side wall. The retainer element 98 may pivot around a vertical pivot axis 99 so as to allow the retainer element 98 to rotate between a first position wherein the retainer element 98 is flush with or recessed relative to the surface of the side wall 95 of the support section 41,42 and a second position (shown in FIG. 18) wherein the retainer element 98 protrudes from the surface of the side wall 95. A spring 100 is mounted in the recess to bias the retainer element 98 to the second position. In the second position the retainer element 98 retains the leading guiding element $15^L$ so that it does not have the tendency to be moved backward (opposite the transport direction $P_T$). Once the leading guiding element $15^L$ has been retained by the retainer unit 97, the leading guiding element $15^L$ may be disconnected from the neighbouring guiding element $15^M$ by the wedge 89 in case the guiding element assembly comprises interconnected guiding elements 15 (in case the guiding assembly comprises guiding elements that are not interconnected or guiding elements that do not even have any of the earlier-mentioned coupling elements the guiding elements obviously do not need to be disconnected).

Alternatively or additionally, a retainer unit 97 may be formed by the earlier-described disconnection unit 80. More specifically, once the first/leading guiding element 15 has been disconnected from the remaining guiding element(s) by the disconnection unit 80, the disconnection unit 80 can be used to retain the first/leading guiding element $15^L$ in place, for instance by positioning the movable wedge 89 against the trailing side of the leading guiding element 15% right after the wedge 89 has been caused to move between the first and second guiding elements to disconnect these guiding elements.

Furthermore, when the guiding elements 15 are not (anymore) connected and the first guiding element is retained by the retainer unit 97, the gripping unit 70 may start with step S900 and continue from there.

The preceding merely illustrates the principles of the invention. It will be appreciated that those skilled in the art will be able to devise various arrangements which, although not explicitly described or shown herein, embody the principles of the invention and are included within the scope of the appended claims.

The invention claimed is:

1. A discharge apparatus for discharging an assembly of guiding elements, each guiding element configured to carry a row of dispensing spouts and each dispensing spout being associated with a flexible pouch container, the discharge apparatus comprising:
   a support comprising at least one support section configured to support the assembly of interconnected guiding elements and the flexible pouch containers carried therein;
   a gripping unit configured to grip a first guiding element of the guiding element assembly and displace the first guiding element of the guiding element assembly in a transport direction substantially perpendicular to a lengthwise direction of the first guiding element;
   one or more abutment elements, arranged to extend from a contact surface of the support, wherein the abutment elements are configured to have the gripping unit arrange the gripped and displaced first guiding element at a fixed position relative to the support; and
   a retaining unit arranged in at least one of the support sections and configured to allow passing of a leading guiding element in the transport direction and block movement of the leading guiding element in an opposite direction;
   wherein the gripping unit is configured to further move the first guiding element and the pouch containers carried therein in the transport direction to a discharge position; and
   wherein the retaining unit is formed by a disconnection unit configured to disconnect at least the gripped and displaced first guiding element from a neighboring second guiding element, the disconnection unit comprising a movable wedge and a wedge drive unit configured to move the wedge between the first and second guiding elements, thereby disconnecting the first guiding element from the second guiding element.

2. The discharge apparatus according to claim 1, wherein the retaining unit comprises a retainer element accommodated in a recess of a side wall of the support section, the retainer element being pivotable so as to allow the retainer element to rotate between a first position wherein the retainer element is flush with or recessed relative to the surface of a side wall of the support section and a second position wherein the retainer element protrudes from the surface of the side wall, the retainer element preferably comprising a spring to bias the retainer element to the second position.

3. Combination of a discharge apparatus according to claim 1 and a handling station comprising a conveyor for transporting guiding elements carrying pouch containers, wherein the discharge apparatus is configured to be placed on top of at least apart of the handling station.

4. A method of discharging an assembly of guiding elements in a discharge assemble according to claim 1, each guiding element being configured to carry a row of dispensing spouts and each dispensing spout being associated with a flexible pouch container, the method comprising:
   placing the assembly of interconnected guiding elements and the flexible pouch containers carried therein on the support comprising at least one support section;
   gripping the first guiding element of the guiding element assembly;
   displacing the gripped first guiding element together with one or more interconnected further guiding elements of the guiding element assembly in the transport direction substantially perpendicular to the lengthwise direction of the first guiding element, wherein the first guiding element is displaced to abut one or more abutment elements, arranged to extend from the contact surface of the support so as to arrange the first guiding element at a fixed position relative to the support;
   passing the first guiding element in the transport direction along the retaining unit arranged in at least one of the support sections and having the retaining unit block the movement of the leading guiding element in the opposite direction; and
   further moving the first guiding element and the pouch containers carried therein in the transport direction to a discharge position.

* * * * *